United States Patent [19]

Taguchi

[11] Patent Number: 5,703,454
[45] Date of Patent: Dec. 30, 1997

[54] IMAGE READING DEVICE FOR SCANNING A DOCUMENT IN FIRST AND SECOND MODES

[75] Inventor: Kazushige Taguchi, Warabi, Japan

[73] Assignee: Ricoh Company, Ltd., Tokyo, Japan

[21] Appl. No.: 578,893

[22] Filed: Dec. 27, 1995

[30] Foreign Application Priority Data

Dec. 27, 1994 [JP] Japan ................... 6-324378

[51] Int. Cl.$^6$ .......................................... H02P 7/00
[52] U.S. Cl. ........................................ 318/685; 318/696
[58] Field of Search ....................... 318/685, 696, 318/561; 312/638, 648, 650, 651, 652, 653, 661, 666, 671; 101/93.17, 93.16, 93.22, 93.29

[56] References Cited

U.S. PATENT DOCUMENTS

| | | | |
|---|---|---|---|
| 3,789,971 | 2/1974 | Deyesso et al. | 318/696 |
| 3,944,902 | 3/1976 | Lacorre et al. | 318/685 |
| 4,025,837 | 5/1977 | Meier et al. | 318/685 |
| 4,340,848 | 7/1982 | Hanagata et al. | 318/561 |
| 4,362,980 | 12/1982 | Itzkowitz | 318/685 |
| 4,525,658 | 6/1985 | Yanagida | 318/696 X |
| 4,680,524 | 7/1987 | Do et al. | 318/696 |
| 4,710,691 | 12/1987 | Bergstrom et al. | 318/696 |
| 5,334,920 | 8/1994 | Ito et al. | 318/685 |

*Primary Examiner*—Jonathan Wysocki
*Attorney, Agent, or Firm*—Oblon, Spivak, McClelland, Maier & Neustadt, P.C.

[57] ABSTRACT

An image reading device has two different modes for controlling the switchover of a motor drive pattern. Either one of the two modes is selected in accordance with various drive conditions including a drive speed. In one mode, in response to every drive pattern switching pulse, pattern data are output by software processing while a position signal is referenced. In the other mode, a macro transfer function is used to output the pattern data by DMA (Direct Memory Access) while the position signal is referenced at every repetition cycle of the drive patterns. The device is capable of reading an image at high speed by switching the drive pattern rapidly, thereby obviating irregularity in a reference position for reading an image.

14 Claims, 29 Drawing Sheets

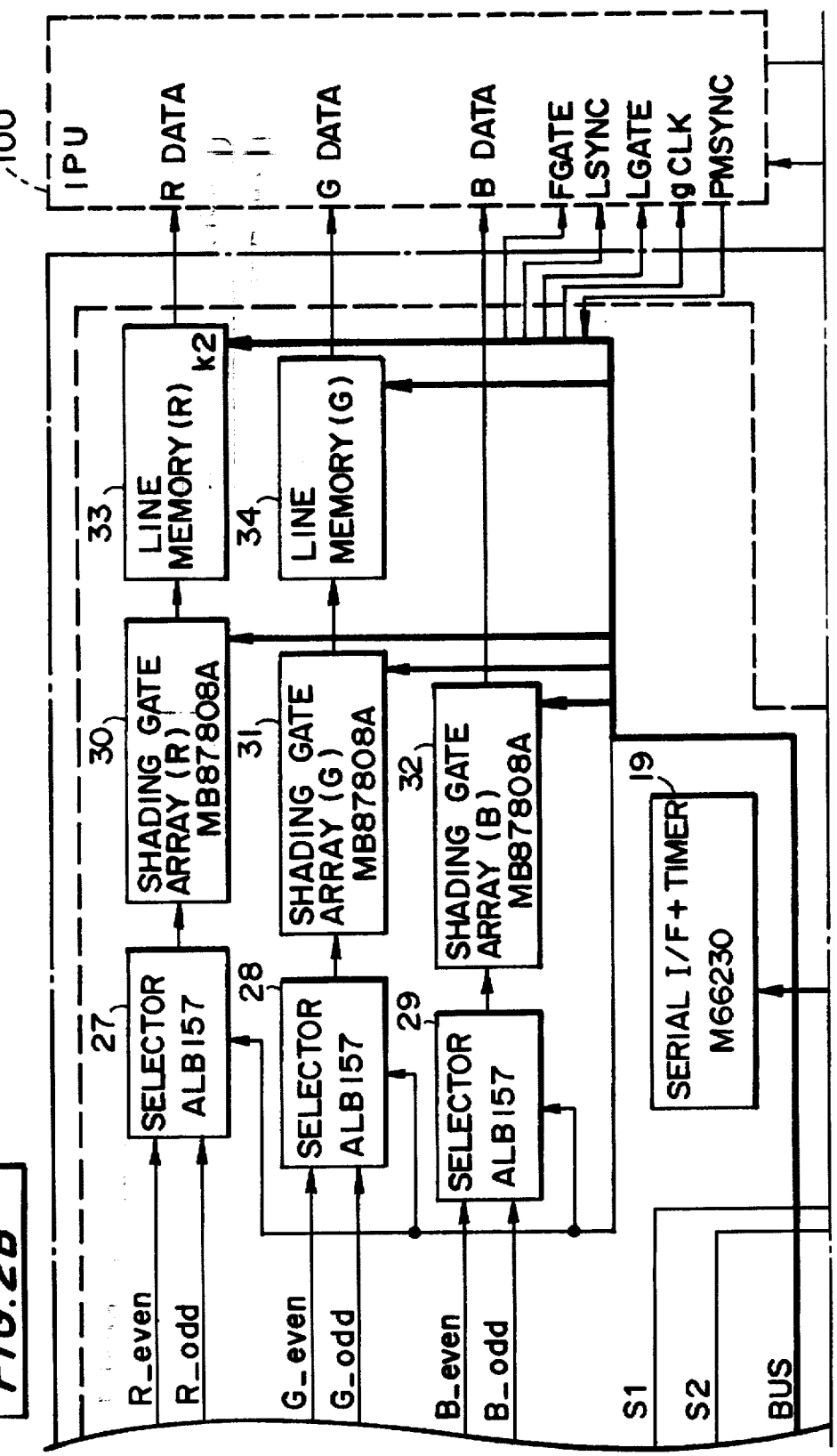

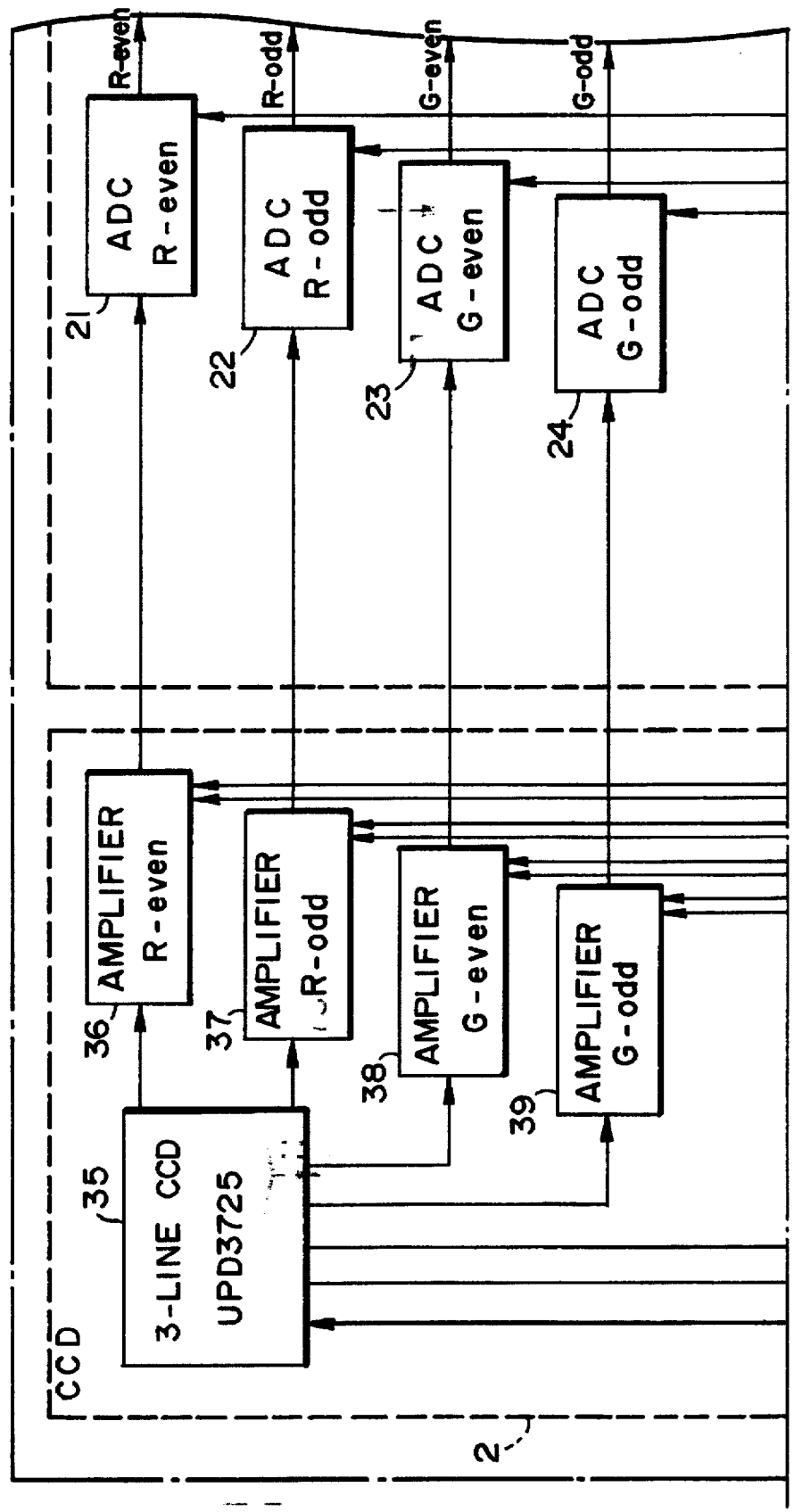

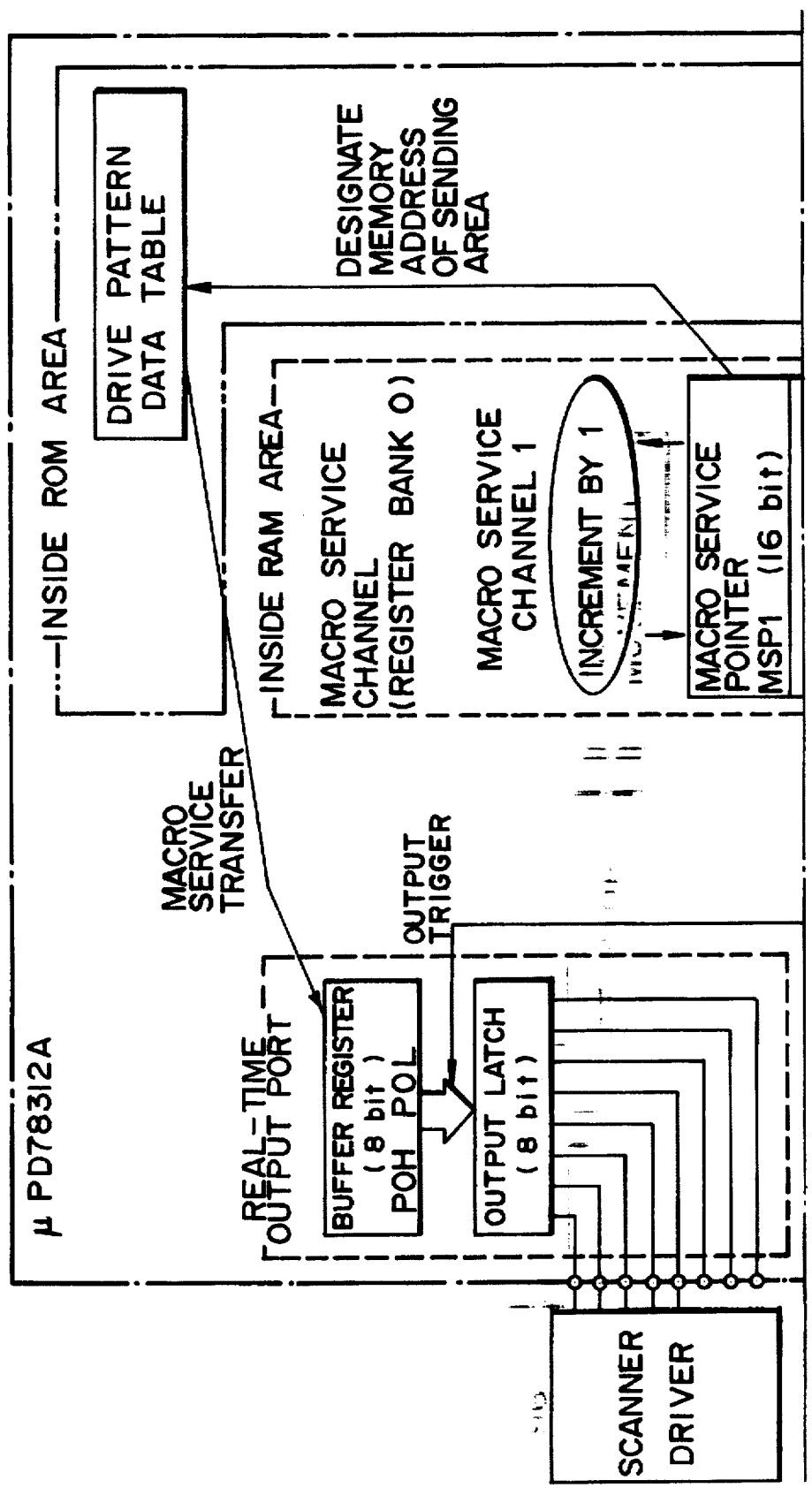

FIG. 5

| FIG. 5A |
|---|
| FIG. 5B |

FIG. 5A

DRIVER PATTERN DATA TABLE

| DRIVE PATTERN OUTPUT ROM DECODE DATA (8 BITS) | |
|---|---|
| FORWARD HALF-STEP DATA 1 ~ FORWARD HALF-STEP DATA 20 | 39 byte |
| RETURN HALF-STEP DATA 1 ~ RETURN HALF-STEP DATA 20 | 39 byte |
| FORWARD FULL-STEP DATA 1 ~ FORWARD FULL-STEP DATA 10 | 19 byte |
| RETURN FULL-STEP DATA 1 ~ RETURN FULL-STEP DATA 10 | 19 byte |

DRIVE SWITCHING TIMING TABLE

| DRIVE PATTERN OUTPUT TIMING DATA (16 BITS) | |
|---|---|
| HALF-STEP SLOW-UP TIMER H1, L1, ", ", H255, L255 | 255 word |
| HALF-STEP SLOW-DOWN TIMER H1, L1, ", ", H255, L255 | 255 word |
| FULL-STEP SLOW-UP TIMER H1, L1, ~ | 255 word |

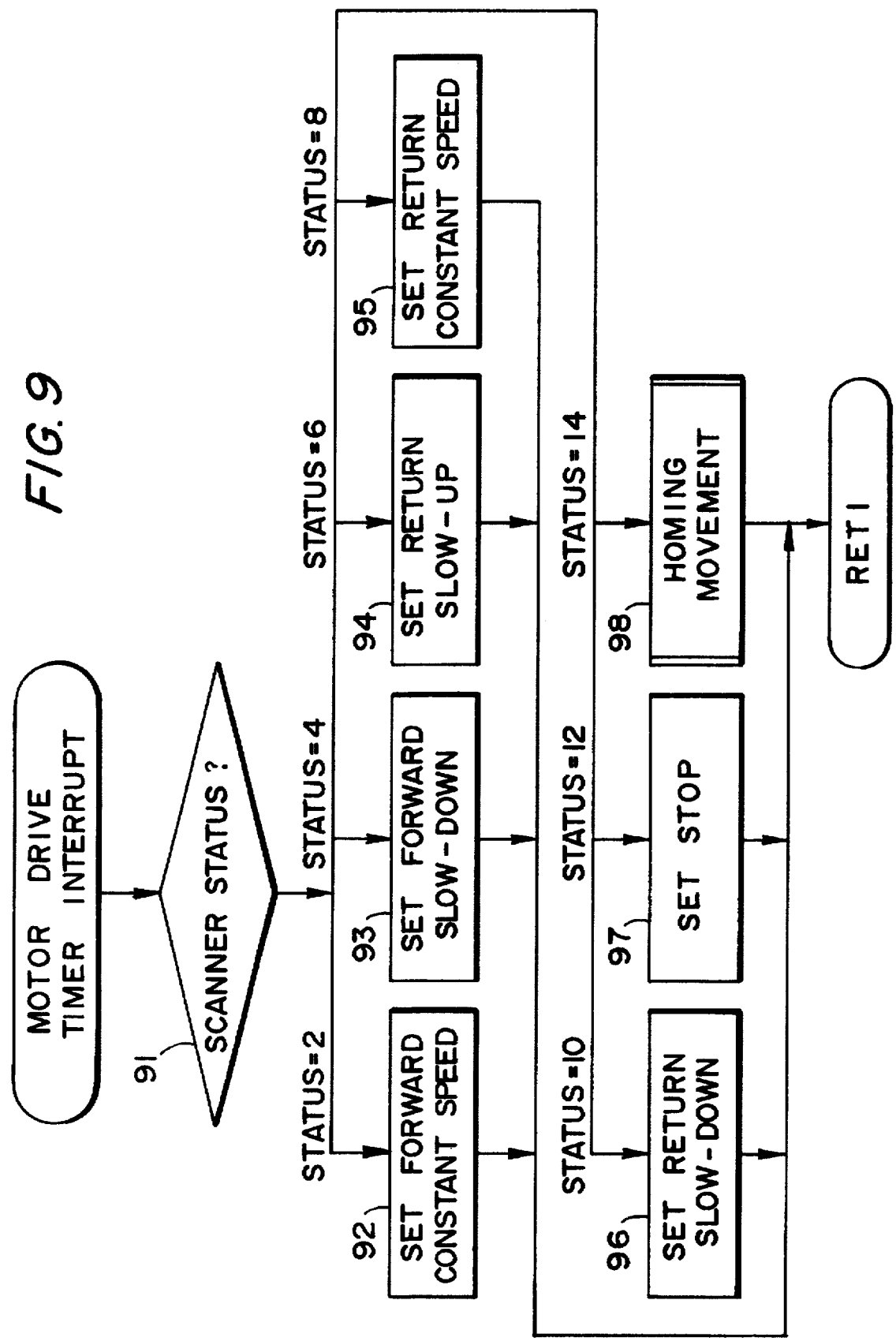

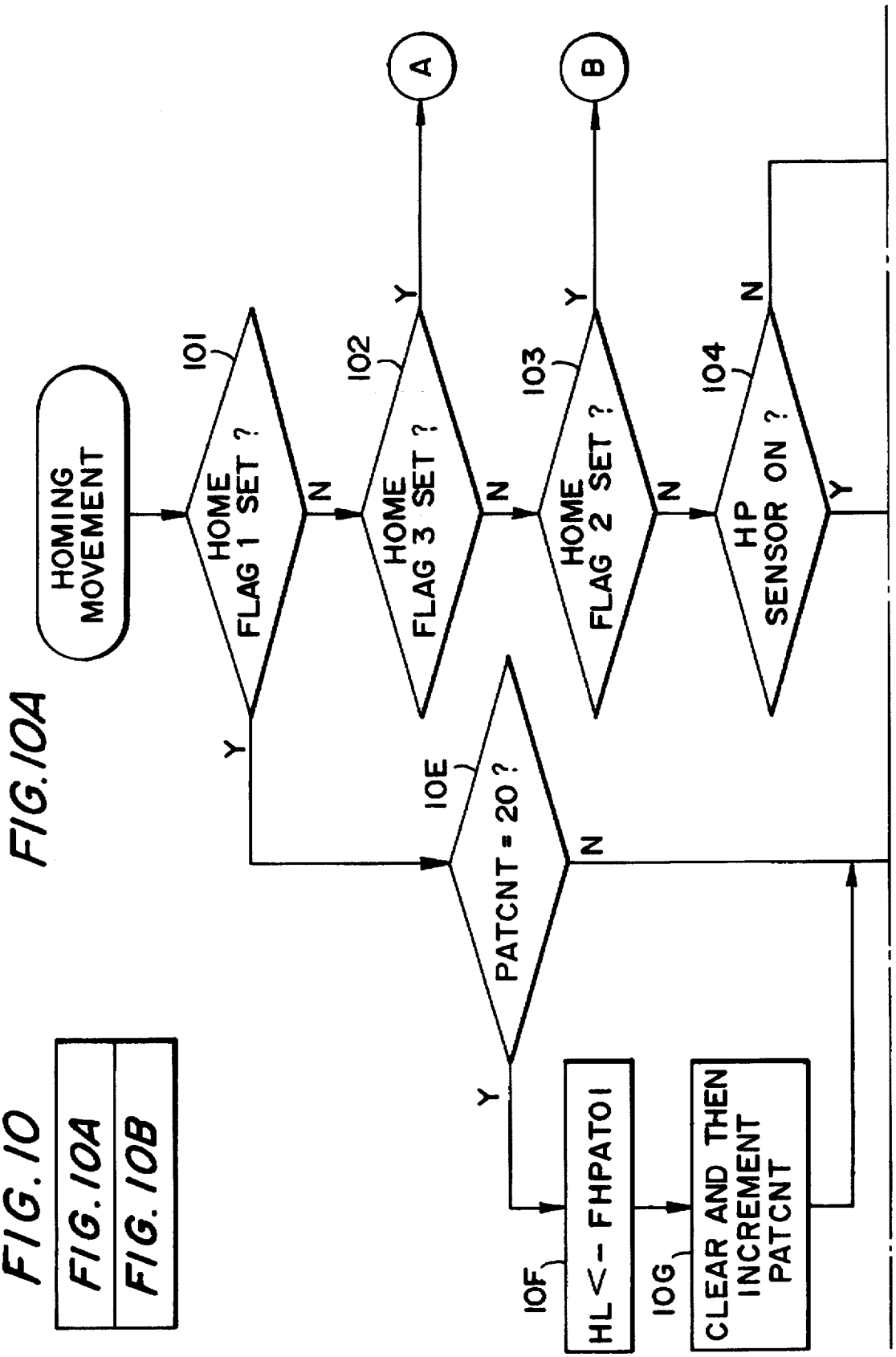

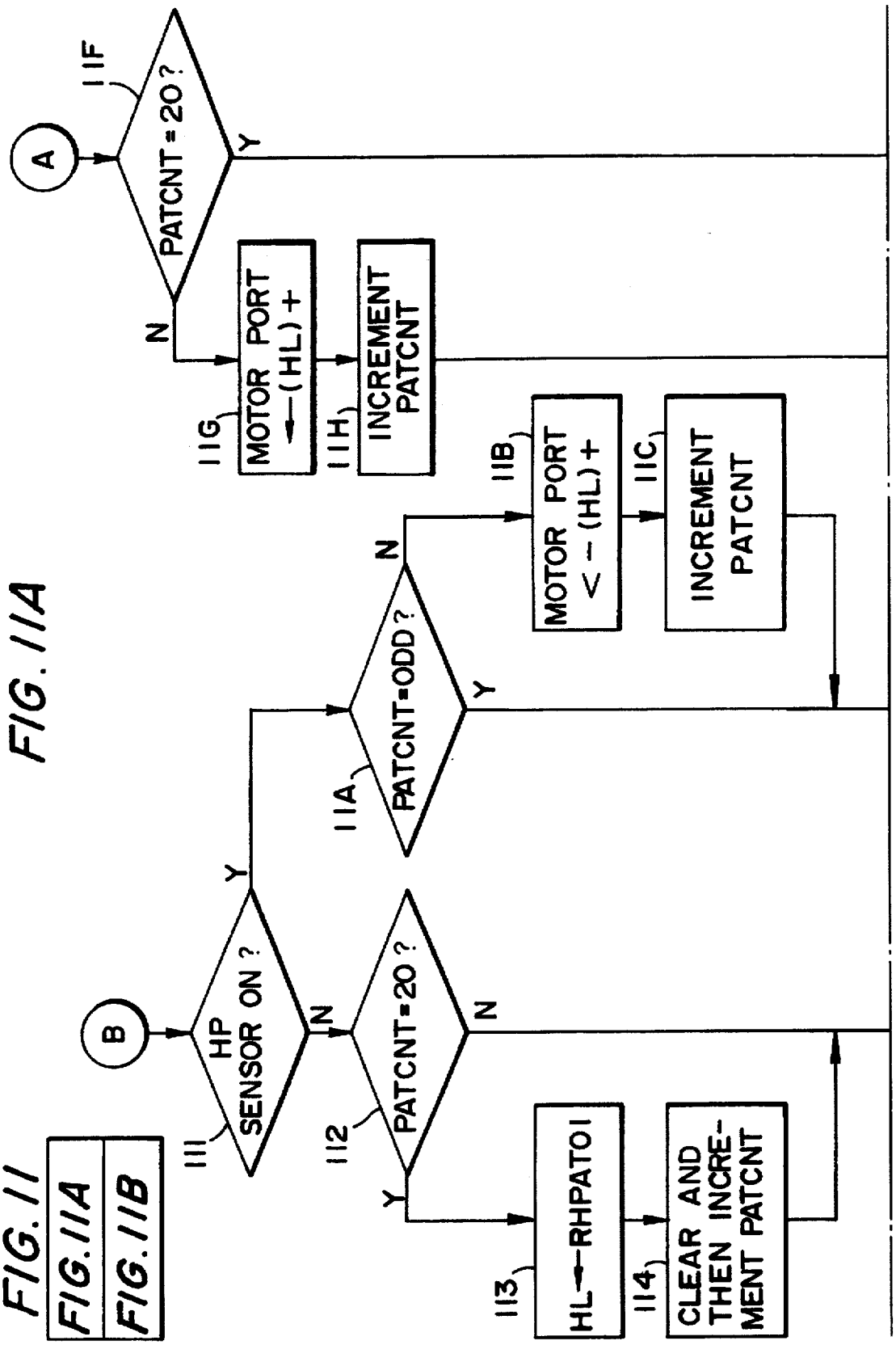

FIG.16

| | CPU 12 | | | | ROM 42 | |
|---|---|---|---|---|---|---|
| RELATIVE ADDRESS | RETURN HALF-STEP | | DATA | DATA | PROM1 | PROM2 |
| 0 | RHPAT01: | DB | 00000001B ; 1 | | 001H | 017H |
| 1 | RHPAT02: | DB | 00000010B ; 2 | | 003H | 017H |
| 2 | RHPAT03: | DB | 00000011B ; 3 | | 002H | 017H |
| 3 | RHPAT04: | DB | 00000100B ; 4 | | 002H | 007H |
| | RHPAT05: | DB | 00000101B ; 5 | | 002H | 00FH |
| | RHPAT06: | DB | 00000110B ; 6 | | 006H | 00FH |
| | RHPAT07: | DB | 00000111B ; 7 | | 004H | 00FH |
| | RHPAT08: | DB | 00001000B ; 8 | | 004H | 00EH |
| | RHPAT09: | DB | 00001001B ; 9 | | 004H | 01EH |
| | RHPAT10: | DB | 00001010B ;10 0AH | | 00CH | 01EH |
| | RHPAT11: | DB | 00001011B ;11 0BH | | 008H | 01EH |
| | RHPAT12: | DB | 00001100B ;12 0CH | | 008H | 01CH |
| | RHPAT13: | DB | 00001101B ;13 0DH | | 008H | 01DH |
| | RHPAT14: | DB | 00001110B ;14 0EH | | 018H | 01DH |
| | RHPAT15: | DB | 00001111B ;15 0FH | | 010H | 01DH |
| | RHPAT16: | DB | 00010000B ;16 10H | | 010H | 019H |
| | RHPAT17: | DB | 00010001B ;17 11H | | 010H | 01BH |
| | RHPAT18: | DB | 00010010B ;18 12H | | 011H | 01BH |
| | RHPAT19: | DB | 00010011B ;19 13H | | 001H | 01BH |
| | RHPAT20: | DB | 00000000B ; 0 | | 001H | 013H |
| | | DB | 00000001B ; 1 | | 001H | 017H |
| | | DB | 00000010B ; 2 | | 003H | 017H |
| | | DB | 00000011B ; 3 | | 002H | 017H |
| | | DB | 00000100B ; 4 | | 002H | 007H |
| | | DB | 00000101B ; 5 | | 002H | 00FH |
| | | DB | 00000110B ; 6 | | 006H | 00FH |
| | | DB | 00000111B ; 7 | | 004H | 00FH |
| | | DB | 00001000B ; 8 | | 004H | 00EH |
| | | DB | 00001001B ; 9 | | 004H | 01EH |
| | | DB | 00001010B ;10 0AH | | 00CH | 01EH |
| | | DB | 00001011B ;11 0BH | | 008H | 01EH |
| | | DB | 00001100B ;12 0CH | | 008H | 01CH |
| | | DB | 00001101B ;13 0DH | | 008H | 01DH |
| | | DB | 00001110B ;14 0EH | | 018H | 01DH |
| | | DB | 00001111B ;15 0FH | | 010H | 01DH |
| | | DB | 00010000B ;16 10H | | 010H | 019H |
| | | DB | 00010001B ;17 11H | | 010H | 01BH |
| | | DB | 00010010B ;18 12H | | 011H | 01BH |
| | | DB | 00010011B ;19 13H | | 001H | 01BH |

FIG. 17

| | CPU 12 | | | | ROM 42 | |
|---|---|---|---|---|---|---|
| RELATIVE ADDRESS | FORWARD HALF-STEP | | DATA | DATA | PROM1 | PROM2 |
| 0 | FHPAT01: | DB | 00010011B ;19 13H | | 001H | 01BH |
| 1 | FHPAT02: | DB | 00010010B ;18 12H | | 011H | 01BH |
| 2 | FHPAT03: | DB | 00010001B ;17 11H | | 010H | 01BH |
| 3 | FHPAT04: | DB | 00010000B ;16 10H | | 010H | 019H |
| | FHPAT05: | DB | 00001111B ;15 0FH | | 010H | 01DH |
| | FHPAT06: | DB | 00001110B ;14 0EH | | 018H | 01DH |
| | FHPAT07: | DB | 00001101B ;13 0DH | | 008H | 01DH |
| | FHPAT08: | DB | 00001100B ;12 0CH | | 008H | 01CH |
| | FHPAT09: | DB | 00001011B ;11 0BH | | 008H | 01EH |
| | FHPAT10: | DB | 00001010B ;10 0AH | | 00CH | 01EH |
| | FHPAT11: | DB | 00001001B ; 9 09H | | 004H | 01EH |
| | FHPAT12: | DB | 00001000B ; 8 08H | | 004H | 00EH |
| | FHPAT13: | DB | 00000111B ; 7 07H | | 004H | 00FH |
| | FHPAT14: | DB | 00000110B ; 6 06H | | 006H | 00FH |
| | FHPAT15: | DB | 00000101B ; 5 05H | | 002H | 00FH |
| | FHPAT16: | DB | 00000100B ; 4 04H | | 002H | 007H |
| | FHPAT17: | DB | 00000011B ; 3 03H | | 002H | 017H |
| | FHPAT18: | DB | 00000010B ; 2 02H | | 003H | 017H |
| | FHPAT19: | DB | 00000001B ; 1 01H | | 001H | 017H |
| | FHPAT20: | DB | 00000000B ; 0 00H | | 001H | 013H |
| | | DB | 00010011B ;19 13H | | 001H | 01BH |
| | | DB | 00010010B ;18 12H | | 011H | 01BH |
| | | DB | 00010001B ;17 11H | | 010H | 01BH |
| | | DB | 00010000B ;16 10H | | 010H | 019H |
| | | DB | 00001111B ;15 0FH | | 010H | 01DH |
| | | DB | 00001110B ;14 0EH | | 018H | 01DH |
| | | DB | 00001101B ;13 0DH | | 008H | 01DH |
| | | DB | 00001100B ;12 0CH | | 008H | 01CH |
| | | DB | 00001011B ;11 0BH | | 008H | 01EH |
| | | DB | 00001010B ;10 0AH | | 00CH | 01EH |
| | | DB | 00001001B ; 9 09H | | 004H | 01EH |
| | | DB | 00001000B ; 8 08H | | 004H | 00EH |
| | | DB | 00000111B ; 7 07H | | 004H | 00FH |
| | | DB | 00000110B ; 6 06H | | 006H | 00FH |
| | | DB | 00000101B ; 5 05H | | 002H | 00FH |
| | | DB | 00000100B ; 4 04H | | 002H | 007H |
| | | DB | 00000011B ; 3 03H | | 002H | 017H |
| | | DB | 00000010B ; 2 02H | | 003H | 017H |
| | | DB | 00000001B ; 1 01H | | 001H | 017H |

FIG. 18

| RETURN FULL-STEP | | DATA | | | PROM1 | PROM2 |
|---|---|---|---|---|---|---|
| RFPAT01: | DB | 00010101B | ;21 | 15H | 003H | 017H |
| RFPAT02: | DB | 00010110B | ;22 | 16H | 002H | 007H |
| RFPAT03: | DB | 00010111B | ;23 | 17H | 006H | 00FH |
| RFPAT04: | DB | 00011000B | ;24 | 18H | 004H | 00EH |
| RFPAT05: | DB | 00011001B | ;25 | 19H | 00CH | 01EH |
| RFPAT06: | DB | 00011010B | ;26 | 1AH | 008H | 01CH |
| RFPAT07: | DB | 00011011B | ;27 | 1BH | 018H | 01DH |
| RFPAT08: | DB | 00011100B | ;28 | 1CH | 010H | 019H |
| RFPAT09: | DB | 00011101B | ;29 | 1DH | 011H | 01BH |
| RFPAT10: | DB | 00010100B | ;20 | 14H | 001H | 013H |
| | DB | 00010101B | ;21 | 15H | 003H | 017H |
| | DB | 00010110B | ;22 | 16H | 002H | 007H |
| | DB | 00010111B | ;23 | 17H | 006H | 00FH |
| | DB | 00011000B | ;24 | 18H | 004H | 00EH |
| | DB | 00011001B | ;25 | 19H | 00CH | 01EH |
| | DB | 00011010B | ;26 | 1AH | 008H | 01CH |
| | DB | 00011011B | ;27 | 1BH | 018H | 01DH |
| | DB | 00011100B | ;28 | 1CH | 010H | 019H |
| | DB | 00011101B | ;29 | 1DH | 011H | 01BH |

FIG. 19

| FORWARD<br>FULL-STEP | | DATA | | PROM1 | PROM2 |
|---|---|---|---|---|---|
| FFPAT01: | DB | 00011101B | ;29 1DH | 011H | 018H |
| FFPAT02: | DB | 00011100B | ;28 1CH | 010H | 019H |
| FFPAT03: | DB | 00011011B | ;27 1BH | 018H | 01DH |
| FFPAT04: | DB | 00011010B | ;26 1AH | 008H | 01CH |
| FFPAT05: | DB | 00011001B | ;25 19H | 00CH | 01EH |
| FFPAT06: | DB | 00011000B | ;24 18H | 004H | 00EH |
| FFPAT07: | DB | 00010111B | ;23 17H | 006H | 00FH |
| FFPAT08: | DB | 00010110B | ;22 16H | 002H | 007H |
| FFPAT09: | DB | 00010101B | ;21 15H | 003H | 017H |
| FFPAT10: | DB | 00010100B | ;20 14H | 001H | 013H |
| | DB | 00011101B | ;29 1DH | 011H | 018H |
| | DB | 00011100B | ;28 1CH | 010H | 019H |
| | DB | 00011011B | ;27 1BH | 018H | 01DH |
| | DB | 00011010B | ;26 1AH | 008H | 01CH |
| | DB | 00011001B | ;25 19H | 00CH | 01EH |
| | DB | 00011000B | ;24 18H | 004H | 00EH |
| | DB | 00010111B | ;23 17H | 006H | 00FH |
| | DB | 00010110B | ;22 16H | 002H | 007H |
| | DB | 00010101B | ;21 15H | 003H | 017H |

FIG. 20A POWER ON/OFF — OFF | ON

FIG. 20B CARRIAGE MOVEMENT

FIG. 20C CARRIAGE MOVEMENT

FORWARD HALF-STEP DRIVE (TIMER VALUE: 1200 μsec)
RETURN HALF-STEP DRIVE (TIMER VALUE: 1200 μsec)
IN HOME SENSOR
SPEED +0−

TIMER VALUE: 1200 μsec = PULSE RATE OF 833 PPS = LINEAR VELOCITY OF 39 mm/sec

IMAGE READING DEVICE FOR SCANNING A DOCUMENT IN FIRST AND SECOND MODES

BACKGROUND OF THE INVENTION

1. Field of the Invention

The present invention relates to an image reading device for a copier, image scanner, facsimile apparatus or similar image forming apparatus and, more particularly, to an image reading device capable of scanning a document at high-speed.

2. Discussion of the Background

Japanese Patent Laid-Open Publication No. 4-54761, for example, proposes to switch a drive mode for a stepping motor, which drives a document scanning unit, at the time of acceleration or deceleration. Generally, it is desirable with an image forming apparatus that the reference position for starting reading a document be maintained constant. When the image reading device is of the type moving a reading section by using a pulse motor, the above reference position is usually spaced a distance corresponding to a preselected number of pulses from a stop position (home position). Hence, high positioning accuracy is required when the reading section is to be brought to a stop. On the other hand, rapid image reading is not achievable unless the reading section is reciprocated at high speed. However, when the reciprocating speed of the reading section is increased, it is necessary to repeatedly switch the drive phase of the pulse motor at a short period, and to repeatedly vary the drive phase switching period at a short period. This kind of control cannot be easily done by the software processing of a microcomputer.

Some modern microcomputers have a macro function which is a kind of DMA (Direct Memory Access) transfer. With the macro function, it is possible to sequentially transfer a plurality of data stored in a preselected area of a memory to a designated port by DMA transfer every time; e.g., a timer interrupt is generated. However, the problem with the macro function is that it cannot be stopped halfway. For example, assume that the macro function is so set as to transfer data twenty consecutive times in order to switch over the drive phase of the pulse motor. Then, when it is necessary to stop the motor after, e.g., the tenth data transfer, the motor cannot be stopped until the remaining ten times of data transfer are completed.

In the actual image reading device, a home position sensor is used to stop the movable reading section at a preselected home position. The timing for stopping the movement of the reading section is determined on the basis of a position where the sensor whose output is monitored has sensed the reading section for the first time. Hence, when the macro function available with a microcomputer is used to control the switchover of the drive phase of the pulse motor, the period at which the output of the sensor can be monitored is increased. As a result, the position where the reading section is stopped, and therefore the reference position for image reading, is varied.

SUMMARY OF THE INVENTION

It is therefore an object of the present invention to provide an image reading device capable of reading an image at high speed while preventing a reference position for image reading from being varied.

An image reading device of the present invention has a movable scanning mechanism including image reading means. A pulse motor drives the scanning mechanism. A position sensor senses the position of the scanning mechanism. A drive control circuit controls the drive of the pulse motor in response to the output signal of the position sensor. A first monitoring circuit monitors the output signal of the position sensor at one pulse period for switching the drive phase of the pulse motor. A second monitoring circuit monitors the output signal of the position sensor at a plurality of pulse periods for switching the drive phase of the pulse motor. A selection control circuit selects either the first monitoring circuit or the second monitoring circuit in accordance with the instantaneous drive condition, and controls the drive of the pulse motor by using the selected monitoring circuit.

BRIEF DESCRIPTION OF THE DRAWINGS

The above and other objects, features and advantages of the present invention will become more apparent from the following detailed description taken with the accompanying drawings in which:

FIG. 9 is a flowchart representative of a single interrupt processing;

FIGS. 16 through 19 are maps each listing a particular part of the contents of a drive pattern data table;

FIG. 20 is a timing chart representative of a homing movement; and

DESCRIPTION OF THE PREFERRED EMBODIMENT

Figure 1:
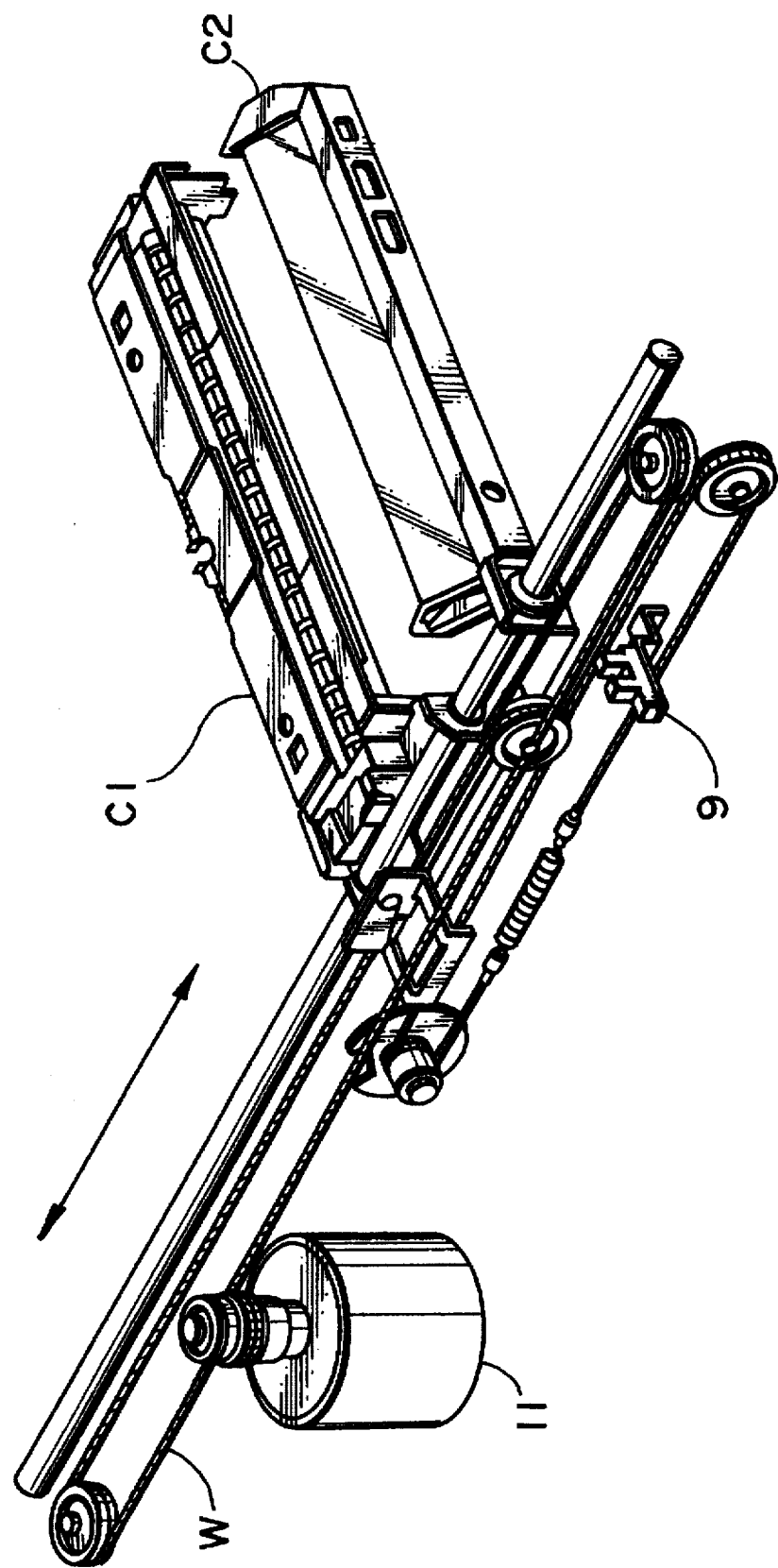
FIG. 1 is an external perspective view of a scanning mechanism included in an image reading device embodying the present invention.

Referring to FIG. 1 of the drawings, an image reading device embodying the present invention is shown and includes scanning optics, not shown. Light issuing from the optics illuminates a document located above the optics. The resulting reflection from the document is incident to a monodimensional image sensor which will be described. A first carriage C1 and a second carriage C2 are driven in a reciprocating motion in directions indicated by a double-headed arrow in FIG. 1, thereby reading the document bidimensionally. The output torque of a scanner motor or pulse motor 11 is transferred to the carriages C1 and C2 via a scanner wire W. A home position (HP) sensor 9 is responsive to a home position assigned to the carriage C1.

Figure 2B:
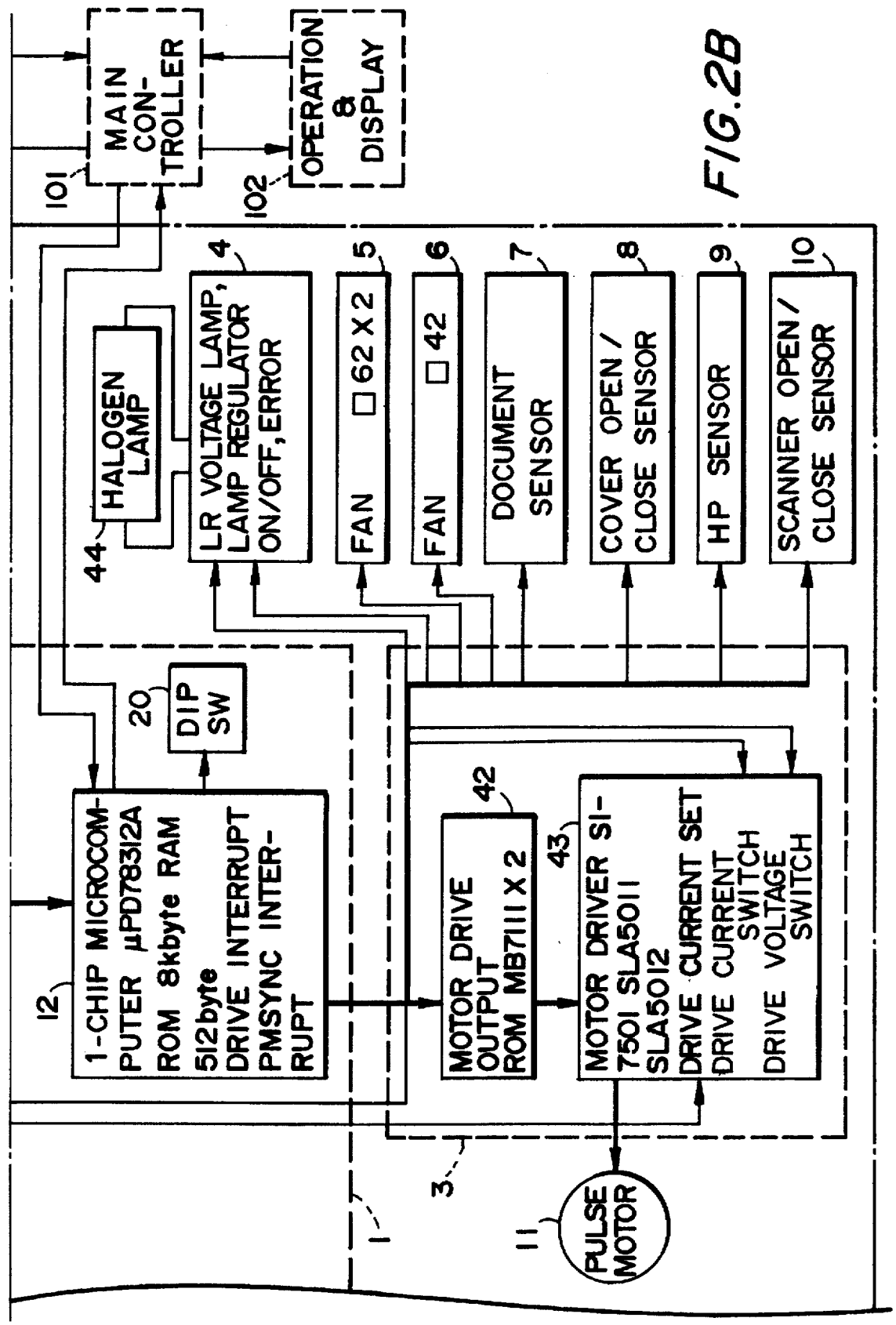
FIG. 2 is a block diagram schematically showing one part of electric circuitry included in the embodiment.
Figure 3B:
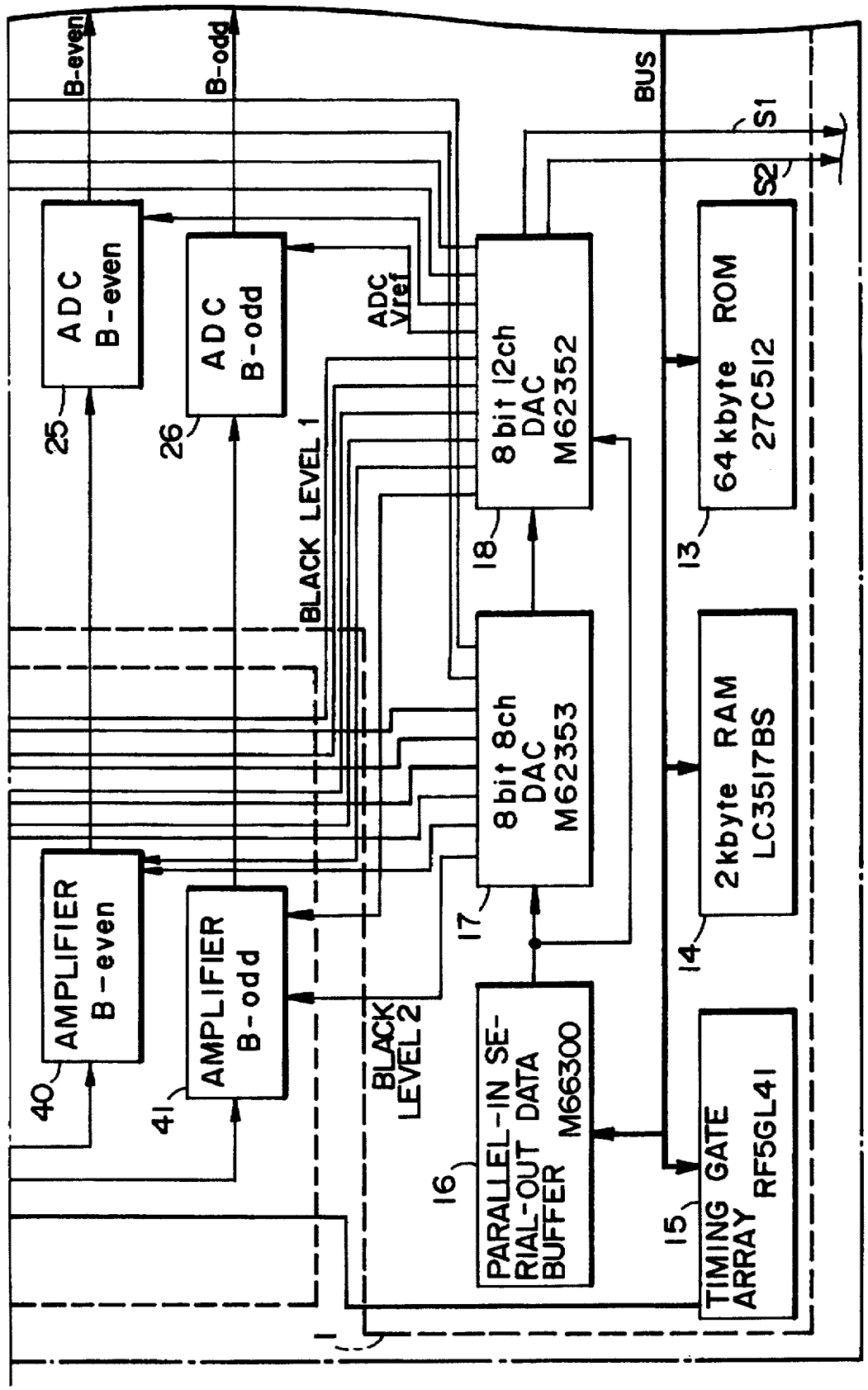
FIG. 3 is a block diagram schematically showing the other part of the electric circuitry.

FIGS. 2 and 3 show in combination electric circuitry included in the embodiment. As shown, the image reading device has an image processing unit (IPU) 100, a main controller 101, an operation and display section 102, and a scanner section. The scanner section has a scanner control board 1, a CCD (Charge Coupled Device) board 2, and a scanner driver board 3. The scanner section mainly performs motor control, automatic setting of analog portions, setting of digital signal processing, document detection, communication with the device body, and adaptation to a projector.

A one-chip microcomputer 12 is provided on the scanner control board 1. The microcomputer 12 writes and reads, e.g., data out of a RAM (Random Access Memory) 14 in accordance with a program stored in a ROM (Read Only Memory) 13, thereby controlling the entire scanner section. The microcomputer 12 is connected to the main controller 101 by a serial communication circuit, and executes commanded processing on the basis of interchanged commands and data. The main controller 101 is connected to the operation and display section 102 by a serial communication circuit, and is capable of setting, e.g., an operation mode in response to a key input from the section 102.

The microcomputer 12 is connected to various I/O (Input/Output) units including a lamp regulator 4, a document sensor 7, the previously mentioned HP sensor 9, a cover open/close sensor 8, cooling fans 5 and 6, and a scanner open/close sensor 10 via the scanner driver board 3 which performs repeat processing. The microcomputer 12 reads the outputs of these I/O units and ON/OFF controls such units.

The scanner driver board 3 has a ROM 42 storing motor drive pattern data, and a motor driver 43 having a predriver and an FET driver. As data sequentially appears on the port of the microcomputer 12, the motor drive pattern data are sequentially read out of the ROM 42 in the form of a drive pulse sequence. The pulse motor 11 is driven by the drive pulse sequence.

A halogen lamp 44 is connected to the lamp regulator 4 and used to illuminate the document. A reflection from the document is routed through mirrors and a lens included in the optics to a three-line CCD image sensor 35 provided on the CCD board 2. The image sensor 35 picks up, under the control of timing control signals output from a gate array 15 included in the scanner control board 1, the line information of image components respectively corresponding to red (R), green (G), and blue (B). The individual color components are separated on the basis of odd pixels and even pixels in the line direction. The resulting serial image signals (analog signals) representative of the odd pixels and even pixels, respectively, are applied to preselected ones of amplifiers 36–41.

The gate array 15 includes an FGATE start counter for counting the pulses of a pixel synchronizing signal PMSYNC. The FGATE start counter starts counting the pulses in response to a signal fed from the output port of the microcomputer 12, thereby outputting a read control signal FGATE.

A particular feedback voltage for adjusting a black level and correcting a dark current is applied to each of the amplifiers 36–41 provided on the CCD board 2. Data output from the microcomputer 12 are transformed to serial data by a parallel-in serial-out data buffer 16 connected to a bus BUS. The serial data are fed to an eight-channel digital-to-analog converter (DAC) 17 and a twelve-channel DAC 18. As a result, feedback voltages appear on the outputs of the DAC 17 and the outputs of the DAC 18. In response to the respective feedback voltages, each of the amplifiers 36–41 adjusts black levels 1 and 2.

Analog image data output from the amplifiers 36–41 and subjected to offset adjustment (DA1 and DA2) are respectively applied to analog-to-digital converters (ADC) 21–26. Reference voltages Vref for the ADCs 21–26 are adjusted (DA3) by the output voltages of the DACs 17 and 18 such that they adapt to the gains of the analog image data.

The ADCs 21–26 each output a particular digital signal corresponding to the analog signal input thereto. A data selector 27 outputs a composite R-even and R-odd signal while a data selector 28 outputs a composite G-odd and G-even signal. Further, a data selector 29 outputs a composite B-odd and B-even signal. The outputs of the data selectors 27–29 are respectively applied to gate arrays 30–32.

The gate arrays 30–32 each have a function of correcting shading, i.e., an irregular light distribution particular to the light source, and an irregular pixel output distribution particular to the CCD image sensor 35. Specifically, when the lamp 44 is turned off, the gate arrays 30–32 set the output data in a memory (black memory), not shown, connected thereto (black correction). When the lamp 44 is turned on, the gate arrays 30–32 set image data representative of a reference density plate (white reference plate) illuminated in a memory (white memory) also connected thereto (white correction). At the time of image reading, output data are processed on the basis of the data stored in the black memory and white memory, so that data subjected to shading correction are output. Further, the gate arrays 30–32 store in the respective registers and in response to a gate signal the maximum mean values of the sums of eight consecutive pixels of one line of image data while distinguishing odd pixels and even pixels. In addition, the gate arrays 30–32 have an image dam outputting function which does not involve shading computation (data through mode). The maximum mean values of eight pixels stored in the registers can be read by the microcomputer 12 connected to the bus BUS.

The image data undergone the shading correction are input to line correction memories 33 and 34. The memories 33 and 34 respectively delay the image data of the number of B and G lines and the image data of the number of B and R lines of the three-line CCD image sensor 35, thereby bringing the B, G and R images into coincidence. The coincident image data are output to an image processing unit (IPU) 100 which will be described. The memories 33 and 34 are set by the gate array 15 in accordance with a magnification (reading speed).

Two PROMs (Programmable ROMs) 42 are connected to the output ports of the microcomputer 12 and used to transform the output data (five bits) of the microcomputer to an actual motor drive pattern (ten bits). In the illustrative embodiment, the pulse motor 11 has a bifilar five-phase drive coil. To drive this type of motor 11, it is necessary to sequentially switch the pattern of a ten-bit control signal (drive control signal). However, only twenty kinds of drive control signal patterns are available even when the motor 11 is driven in a half-step mode. In light of this, five-bit data capable of distinguishing twenty kinds of patterns are output from the microcomputer 12. The two PROMS 42 convert such data to a ten-bit drive control signal. The ten-bit drive control signal is fed to the motor driver 43. In response, the motor driver 43 drives the five-phase drive coil of the motor 11 on a bipolar basis via the predriver (SI-7501) and FET driver (SLA5011 and SLA5021).

All the five-bit data patterns (drive patterns) to be fed to the motor driver 43 are stored in a ROM built in the microcomputer 12 in the form of a patten data table. The contents of the table and the output data of the PROMs 42 are shown in FIGS. 16–19. Specifically, FIG. 16 shows data for half-step drive control to be executed during return drive while FIG. 17 shows data for half-step drive to be executed during forward drive. FIG. 18 shows data for full-step drive control to be executed during return drive while FIG. 19 shows data for full-step drive control to be executed during forward drive.

As shown in FIG. 16, the table stored in the microcomputer 12 has serial addresses X+0, X+1, X+2, ... (where X is the leading address of the table). Thirty-nine data 1, 2, 3, 4, ..., 18, 19, 0, 1, ... each having five valid bits are sequentially arranged at the above addresses of the table. Labels RHPAT01, RHPAT02, RHPAT03, ... are respectively assigned to the addresses X+0, X+1, X+2, ... For example, when five-bit data "00001B" labeled RHPAT01 (where B and H are respectively binary notation and hexadecimal notation) is output from the microcomputer 12, it is applied to a PROM1 and a PROM2 constituting the ROM 42 as an address. In response, the PROM/ and PROM2 respectively output data 001H and 017H each having five bits. These data are applied to the motor driver 43. In FIG. 16, while twenty different data are respectively arranged at the positions RHPAT01–RHPAT20, they are followed by nineteen data which are identical with the data arranged at the positions RHPAT01–RHPAT19. By sequentially outputting the twenty kinds of data RHPAT01–RHPAT20, it is possible to sequentially change the drive phase and thereby drive the motor 11 continuously in the return direction (reverse direction). In addition, it is possible to output the twenty kinds of data without regard to the position (RHPAT01–RHPAT20) where the data is output first. In this manner, when thirty-nine data in total are listed in the table, any one of the twenty kinds of drive patterns can be selected first in the event of starting driving the motor 11. This is also true with FIGS. 17, 18 and 19. However, in the full-step drive mode, because the number of drive patterns is small, only ten kinds of data and only nineteen data are available, as shown in FIGS. 18 and 19. The tables shown in FIGS. 16–19 are selectively used to effect half-step return drive, half-step forward drive, full-step return drive, or full-step forward drive.

Figure 5B:
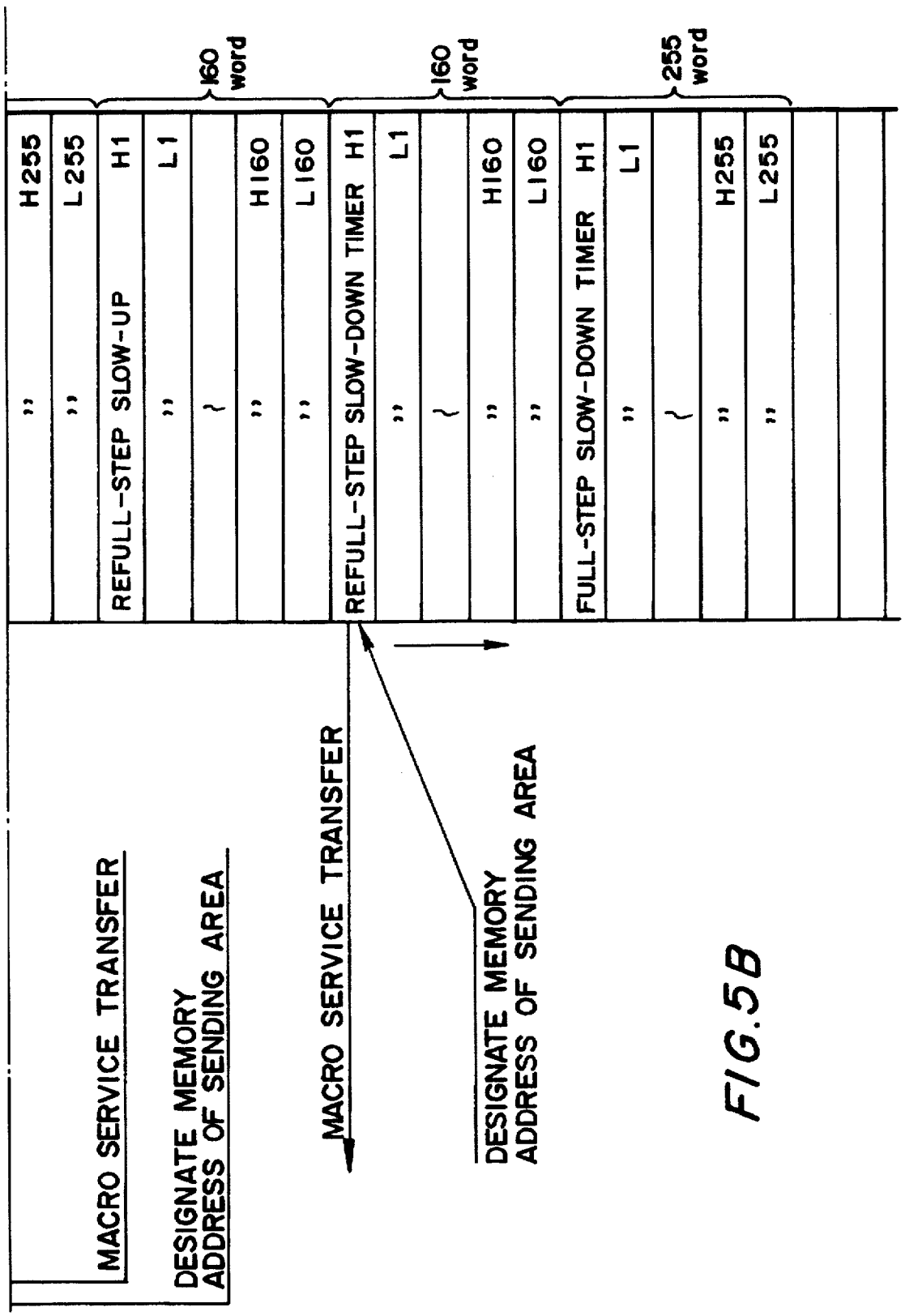
FIG. 5 is a map listing the contents of a data table.

FIG. 5 shows a drive switching timing table also stored in the microcomputer 12. The timing table lists a group of data for determining a period at which the drive pattern should be switched over. By changing the drive pattern switching period, it is possible to control the acceleration and deceleration of the motor 11. The data stored in the table has sixteen bits, or one word, each. As shown in FIG. 5, 255 words are assigned to each of the slow-up control of half-step drive and the slow-down control of half-step drive. 255 words are assigned to the slow-up control of full-step drive, 160 words are assigned to the reslow-down of full-step drive, and 255 words are assigned to the slow-down control of full-step drive.

The HP sensor 9 connected to the microcomputer 12 senses the scanning unit (first carriage C1) when it is brought to the home position. In the illustrative embodiment, when the scanning unit moves about 10 mm away from the HP sensor 9 in the return direction (mechanical limit position), it is mechanically restricted.

The control over the motor 11 will be described hereinafter. The microcomputer (µPD78312A) 12 implements the selection of the drive pattern and the control over the drive pattern switching timing with a macro service function using hardware built therein.

The macro service function, which is a kind of DMA function, is used to reduce the frequency of interrupt mainly needing software processing, to reduce overhead ascribable to a sequence consisting of interrupt processing, saving to a register, restoration from the register, and return from an interrupt service routine, and to thereby improve the service time of a CPU.

Figure 4B:
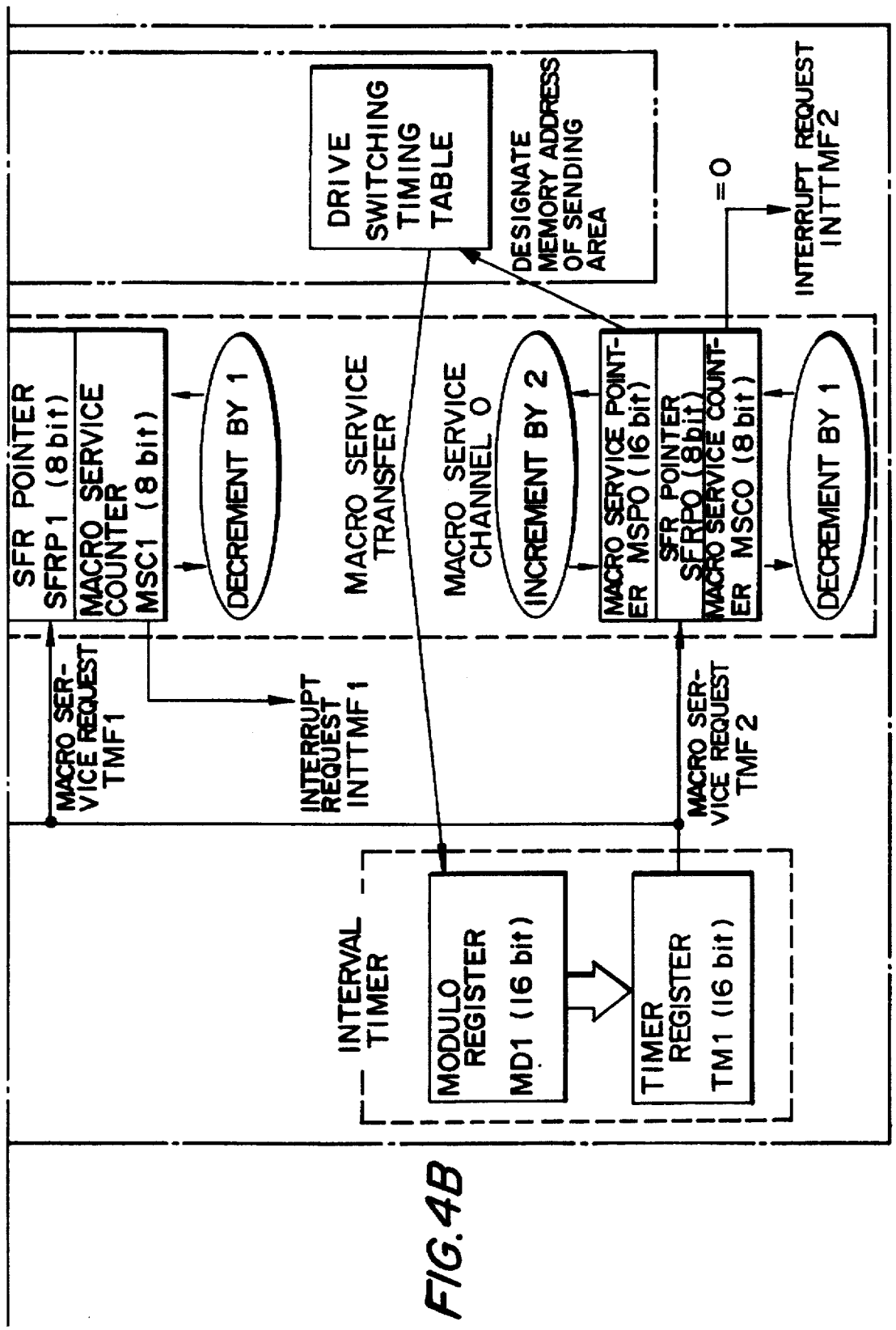
FIG. 4 is a schematic block diagram demonstrating a macro function available with a microcomputer included in the electric circuitry.

How the microcomputer 12 selects the drive pattern of the motor 11 and switches the drive pattern will be described with reference to FIG. 4. As shown, two channels are assigned to the macro service function. Macro service pointers MSP0 and MSP1, SFP pointers SFRP0 and SFRP1, and macro service counters MSC0 and MSC1 are allocated to the two channels, as illustrated. The selection of the macro service channel, selection of the data transfer direction, and selection of the transfer mode (eight- or sixteen-bit transfer, MSP increment, or hold) are made on the basis of the setting of a service control register, not shown.

In the illustrative embodiment, settings for determining the drive pattern switching timing are effected on a macro service channel 0. Specifically, the leading address of each area of the drive switching timing table is set on the macro service pointer MPS0 as a memory address representative of a destination. The address of a modulo register MD1 included in an interval timer is set on the SFR pointer SFRP0 as a destination register. The number of times of transfer is set on the macro service counter MSC0. The number of times of transfer is, e.g., 255 when the slow-up control of half-step drive is executed, or 160 when the reslow-up control of full-step drive is executed.

The modulo register MD1 holds an interval preset in a timer register TM1. When "1" is set on bit 7 of a timer control register TMC0, not shown, the interval timer is caused to start counting time. On the start of the interval timer, the value stored in the modulo register MD1 is preset in the timer register TM1. The interval timer down-counts the interval in response to a preselected clock. When underflow occurs, i.e., when the predetermined period of time elapses, flags TMF1 and TMF2 are set with the result that a macro service request is generated. When the flag TMF2 is set, one word of data of the drive switching timing table and corresponding to the destination address indicated by the pointer MSP0 is transferred to the register MD1 by DMA. Then, the pointer MSP0 is incremented by 2 (due to sixteen-bit transfer).

The flag TMF1 generates a macro service request for the macro service channel 1. Settings for selecting the drive pattern data for the motor 11 are effected on the channel 1. Specifically, the leading address of the area of the drive pattern data table is set on the macro service pointer MSP1 as a memory address representative of a destination. The addresses of buffer registers POH and POL included in a real-time output port (motor output port) are set on the SFR pointer SFRP1 as a destination register. The number of times of transfer set on the macro service counter MSC1 is twenty in the event of half-step drive control, or ten in the event of full-step drive control. Execution starts when "1" is set on bit 5 of an interrupt request register TMIC1.

Among one byte of data existing at the destination memory address designated by the pointer MSP1 (one address on the drive pattern data table), higher four bits and lower four bits are respectively transferred to the buffer registers POH and POL by DMA. Then, the pointer MSP1 is incremented by 1 (due to eight-bit transfer) in order to designate the address where the next data exists. Further, the counter MSC1 is decremented by 1.

Therefore, by the processing on the macro service channel 1, twenty bytes of forward half-step data 1 to forward half-step data 20, for example, listed on the drive pattern data table are sequentially transferred to the real-time output port by DMA, one byte at a time. The period for transferring the data, i.e., for switching the drive pattern of the motor 11, is determined by the period of occurrence of the macro service request TMF1, i.e., by the data of the drive switching timing table transferred by the processing on the macro service channel 0. By the processing on the macro service channel 0, half-step slow-up timer values H1 and L1 to H255 and L255, for example, listed on the timing table are sequentially transferred to the register MD1 by DMA, one word at a time. As a result, the period for switching the drive pattern is automatically changed so as to accelerate or decelerate the motor 11. That is, as far as the drive pattern switching is concerned, the only software processing which the microcomputer 12 executes is one relating to the starts and stops of the macro service. Hence, the drive pattern can be rapidly switched over by the macro service.

However, the problem is that once the continuous data transfer available with the macro service function begins, the macro service cannot be stopped until all the data have been transferred. It follows that when the drive pattern is switched by the macro service function, the drive condition of the motor 11 (stop or the like) can be switched only when a single micro service sequence entirely ends. For example, assume that twenty bytes of data on the drive pattern data table are sequentially transferred by the processing on the macro service channel 1. Then, the drive condition can be changed only once for twenty drive pattern switching periods. This does not matter at all so long as the scanner is driven at its usual speed. However, when the scanner is to be positioned (stopped) at its home position, the positioning accuracy is lowered because the stop position is determined with the accuracy of a distance corresponding to twenty times of drive pattern switching. Further, the reference position for the scanner to start reading an image is determined on the basis of a point at which the output of the HP sensor 9 varies. However, when the macro service is under way, even if the output of the HP sensor 9 varies, the microcomputer 12 cannot recognize it by software processing until the entire macro service completes. As a result, there occurs a lag between the time when the output of the HP sensor 9 actually varies and the time when the microcomputer 12 recognizes it. The lag directly translates into irregularity in the reference position where the scanner starts reading an image.

In light of the above, the embodiment has two different operation modes for controlling the drive of the motor 11. In one of the two modes, the embodiment executes drive control by using the macro service. In the other mode, the embodiment recognizes the output of the HP sensor 9 in response to every pattern switching pulse by software processing. Although it is difficult to repeatedly transfer the drive pattern data at a short period by software processing, it is not necessary to drive the scanner at high speed when the scanner is moved for determining its reference position. Hence, it is possible to transfer the drive pattern data by software processing.

Figure 6:
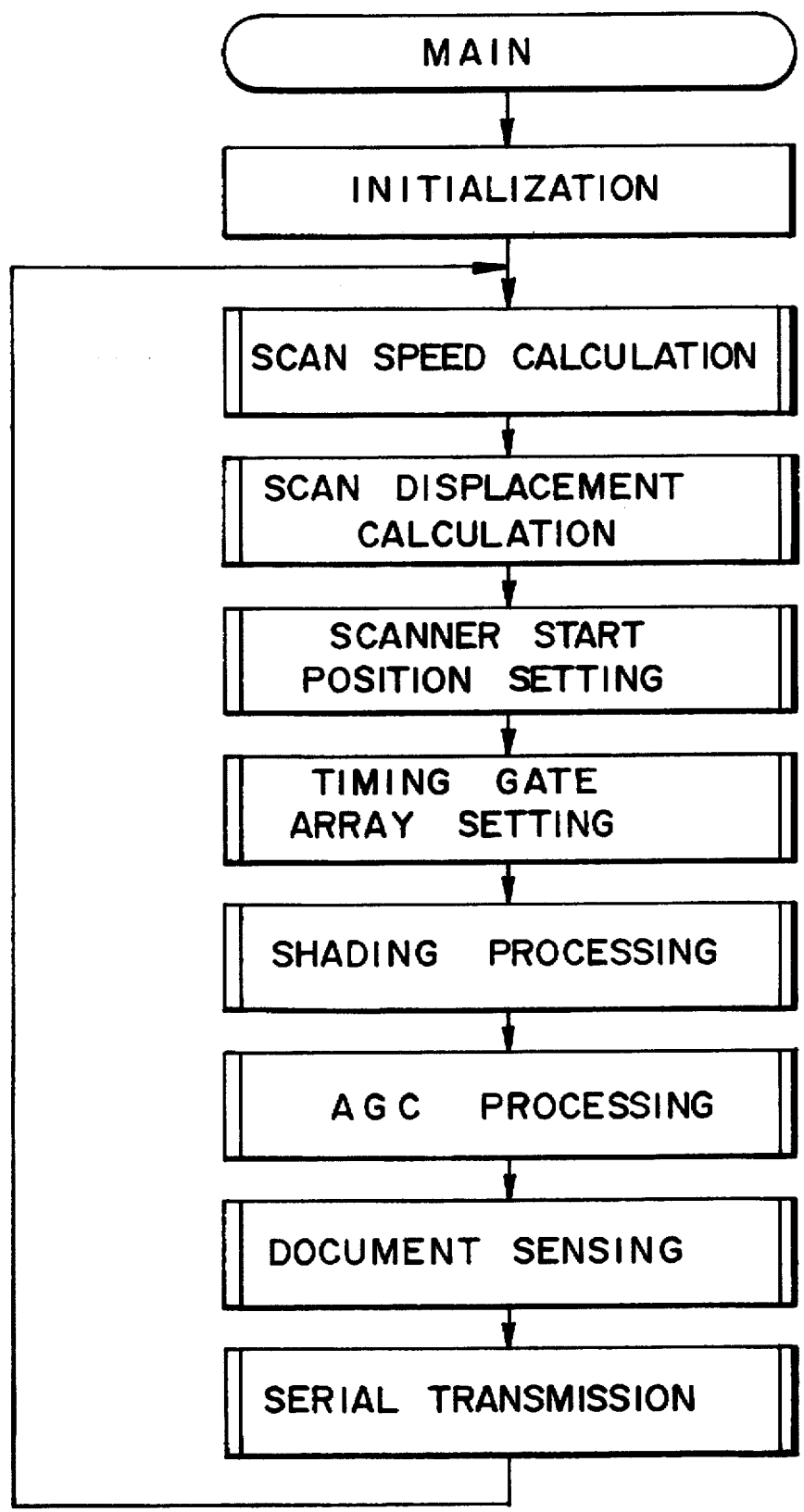
FIG. 6 is a flowchart showing a main routine to be executed by the microcomputer.

FIG. 6 shows a main routine to be executed by the microcomputer 12. As shown, when power is up, the microcomputer 12 executes initialization and then sequentially repeats various kinds of processing necessary for reading an image, i.e., calculation of a scanning speed, calculation of a scanning displacement, setting of a scanner start position, setting of a timing gate array, shading correction, AGC (Automatic Gain Control) processing, detection of a document, and serial transmission.

Figure 7:
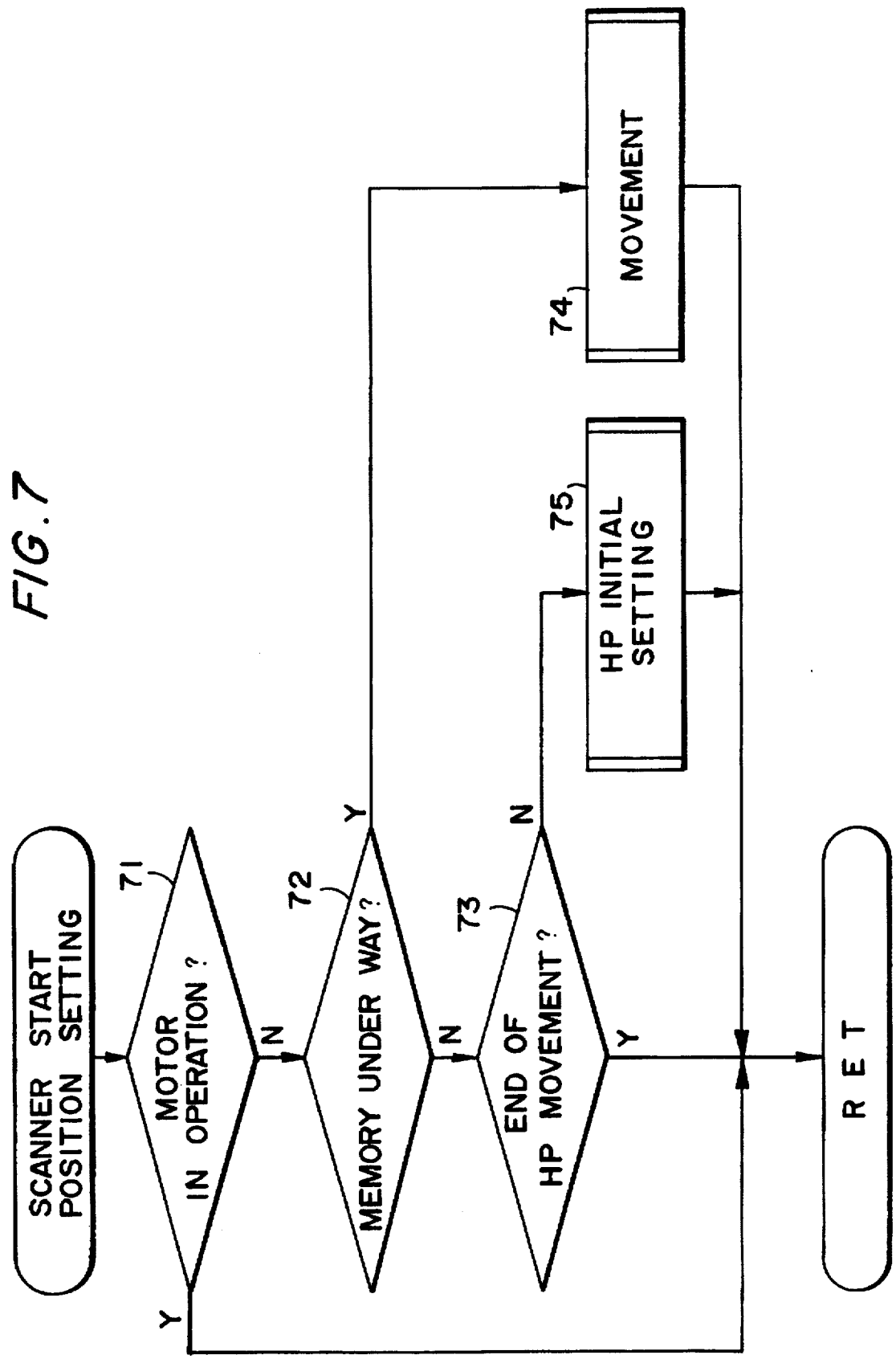
FIG. 7 is a flowchart showing a part of the procedure of FIG. 6 in detail.

In the main routine shown in FIG. 6, a routine labeled "SCANNER START POSITION SETTING" characterizes the embodiment. FIG. 7 shows this subroutine in detail. As shown, the microcomputer 12 determines whether or not the motor 11 is in operation (step 71). If the answer of the step 71 is negative (NO), the microcomputer 12 determines whether or not a movement is under way (step 72). If the answer of the step 72 is NO, the microcomputer 12 determines whether or not HP operation has ended (step 73). Immediately after the power-up, the step 73 is followed by a step 75 because the HP operation is not executed. The step 75 labeled "HP INITIAL SETTING" will be described with reference to FIG. 8.

Figure 8:
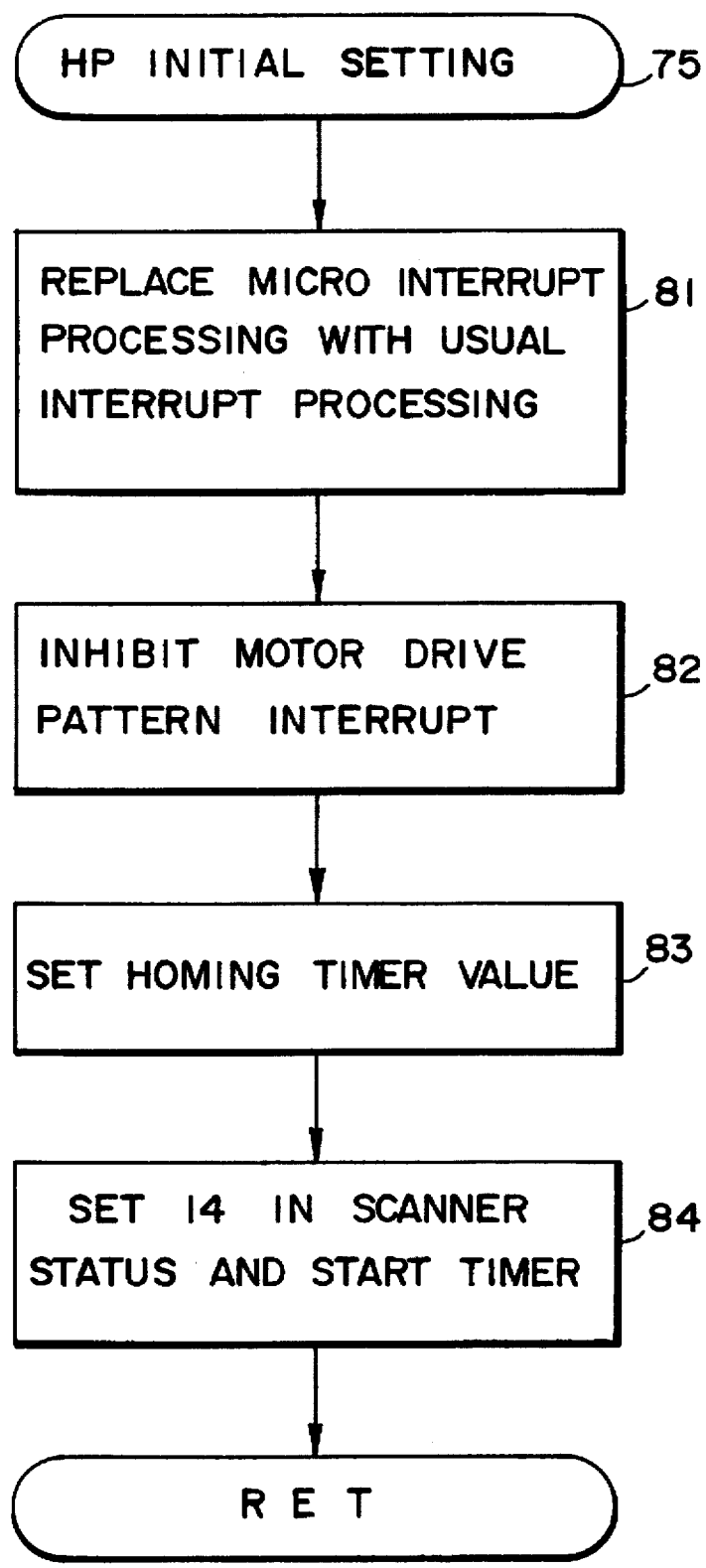
FIG. 8 is a flowchart showing a part of the procedure of FIG. 7 in detail.

As shown in FIG. 8, the microcomputer 12 switches over an interrupt mode (step 81). Specifically, the microcomputer 12 changes the value of the interrupt request register in order to switch motor drive pattern interrupt and motor drive timer interrupt, which will be described, from macro control interrupt processing to usual interrupt processing. Then, the microcomputer 12 inhibits the motor drive pattern interrupt (step 82). In this case, the motor drive pattern is set within the motor drive timer interrupt. Subsequently, the microcomputer 12 sets a time (drive pattern switching period) for a homing movement (which determines a reference position) in a timer (step 83). Then, the microcomputer sets "14" in a scanner status and starts the timer (step 84).

When the time set in the timer is up, a motor drive timer interrupt request is generated. In response, the microcomputer 12 executes the motor drive timer interrupt shown in FIG. 9. In FIG. 9, the microcomputer 12 determines the contents of processing on the basis of the current value of the scanner status. Immediately after the setting of the initial HP operation, the scanner status is "14", so that the microcomputer 12 sets a homing movement in a step 98.

Figure 10B:
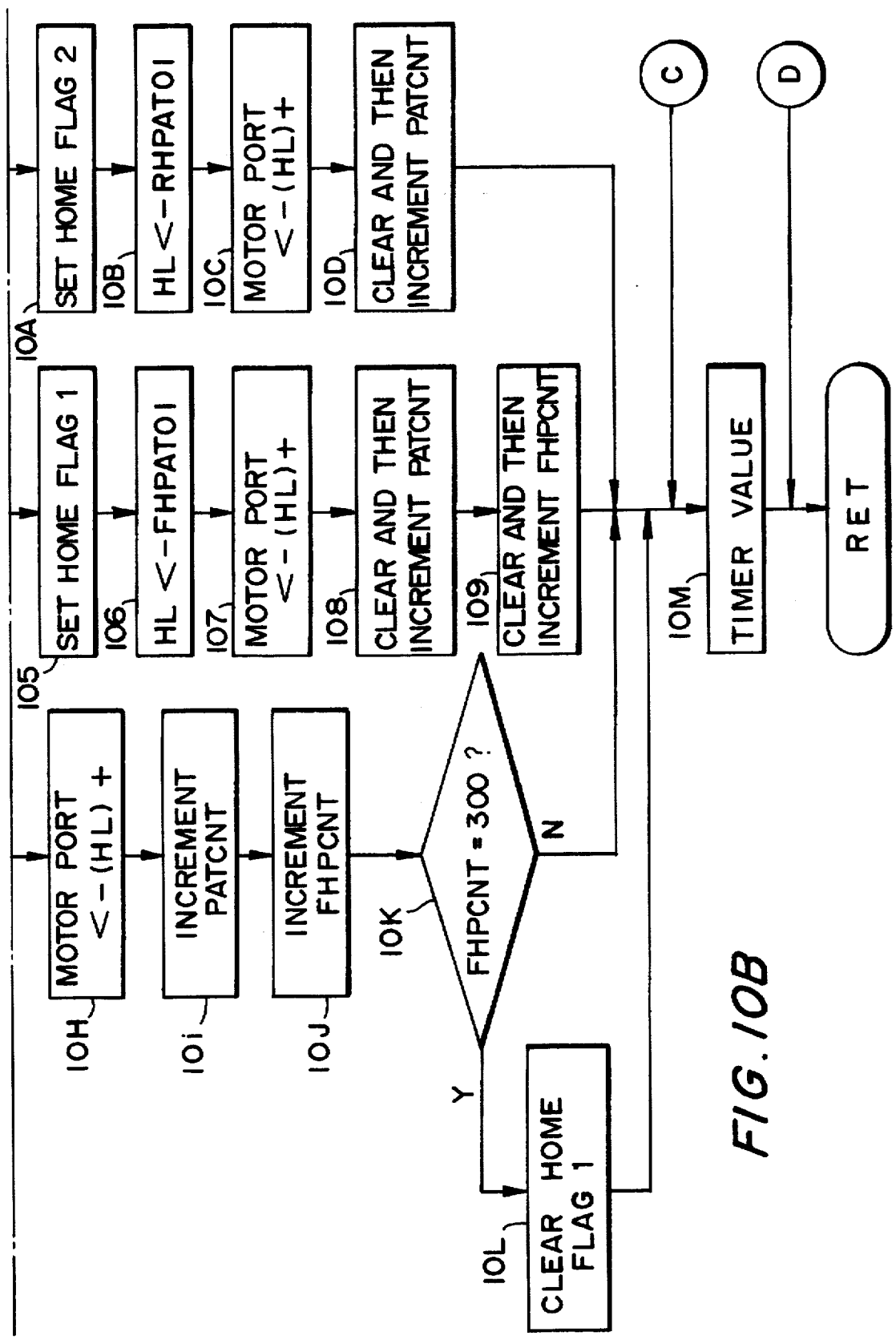
FIG. 10 is a flowchart showing a part of the processing of FIG. 9 in detail.
Figure 11B:
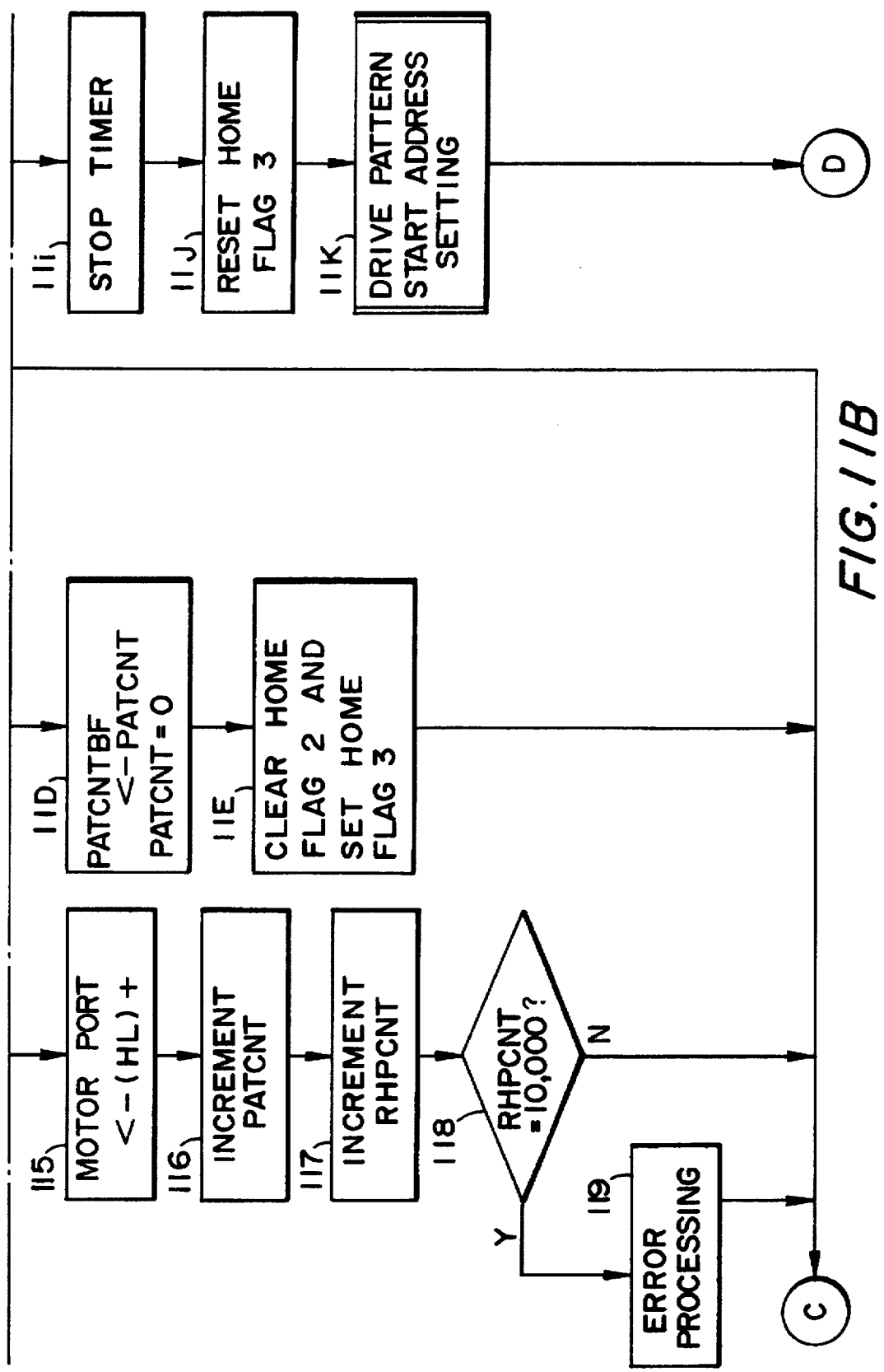
FIG. 11 is a flowchart showing another part of the processing of FIG. 9 in detail.

FIGS. 10 and 11 show the above step 98 in detail. As shown, initially none of home flags 1, 2 and 3 is set. Hence, the microcomputer i 2 sequentially executes steps 101, 102, 103 and 104. In the step 104, the microcomputer 12 checks the output of the HP sensor 9 to see if it is in an ON state. If the answer of the step 104 is positive (YES), meaning that the first carriage C1 lies in the sensing range of the HP sensor 9, the microcomputer 12 drives the motor 11 in the forward direction and thereby moves the carriage C1 to the outside of the sensing range. Subsequently, the microcomputer 12 drives the motor 11 in the reverse direction in order to return the carriage C1 to its home position.

Specifically, the microcomputer 12 sets the home flag 1 (step 105), and stores an address value labeled FHPAT01 in an HL register (inside register) (step 106). Then, the microcomputer 12 transfers the drive pattern data for the forward half-step drive mode and existing at an address FHPAT01 (see FIG. 17) to the real-time output port for motor control (step 107). The above data is represented by the content of the HL register. The drive pattern data is applied to the scanner driver 3. The content of the HL register is incremented in the step 107. It is to be noted that the actual drive pattern is generated by the ROM 42 included in the scanner driver 3. Subsequently, the microcomputer 12 clears a drive pattern counter PATCNT and a forward HP counter FHPCNT, and then increments them (steps 108 and 109). The microcomputer 12 sets the timer value (step 10M), escapes this subroutine, and then ends the interrupt processing (RETI).

When the homing movement shown in FIG. 10 is effected, the interrupt occurs every pulse time, i.e., every time the drive pattern is switched because the usual interrupt mode has been set up. At the time of the second interrupt processing, the home flag 1 is set. Hence, the microcomputer 12 executes a step 10E after the step 101 in order to determine whether or not PATCNT is "20". If the answer of the step 10E is NO, the microcomputer 12 outputs the drive pattern data to the real-time output port (step 10H). If the answer of the step 10E is YES, the microcomputer 12 again sets FHT01, i.e., the leading address of the table in the HL register (step 10F). As a result, the pattern corresponding to the leading FHPAT01 of the table to the pattern corresponding to FHPAT20 are sequentially selected. FHPAT20 is again followed by FHPAT01. The microcomputer 12 clears PATCNT and then increments it (step 10G).

The microcomputer 12 increments the counter PATCNT every time it executes a step 10i, and increments the counter FHPCNT every time it executes a step 10J. In a step 10K, the microcomputer 12 checks the content of the counter FHPCNT which is representative of a displacement in the forward direction; in the embodiment, a displacement corresponding to a single pulse is 0.0471 mm. Specifically, in the step 10K, the microcomputer 12 determines whether or not the displacement corresponds to 300 pulses (0.0471× 300=14.13 mm). If the answer of the step 10K is YES, the microcomputer 12 clears the home flag 1 (step 10L).

After the step 10L, the next interrupt processing is executed as follows. Because the HP sensor 9 is in its OFF state, i.e., the first carriage does not exist around the home position (NO, step 104), the microcomputer 12 sets the home flag 2 (step 10A). Then, the microcomputer 12 stores an address value labeled RHPAT01 in the HL register (step 10B), and transfers the data represented by the content of the HL register, i.e., the pattern data for the return half-step drive mode and corresponding to RHPAT01 (see FIG. 16) to the real-time output port (step 10C). The microcomputer 12 increments the content of the HL register so as to designate the next drive pattern. The microcomputer 12 clears the counter PATCNT and then increments it (step 10D). By such a procedure, the carriage begins to be moved in the return direction.

To execute the interrupt processing after setting the home flag 2, the microcomputer 12 determines whether or not the HP sensor 9 is in the ON state (step 111, FIG. 11). Every time the microcomputer executes the interrupt processing, i.e., switches the drive pattern, it transfers the address indicated by the HL register (drive pattern data shown in FIG. 16) to the real-time output portion and increments the HL register (step 115). The resulting content of the HL register is representative of the address of the next drive pattern data. When the counter PATCNT reaches "20" (YES, step 112), the microcomputer 12 again sets the leading address of the area of the table designated by the label RHPAT01 in the HL register (step 113). As a result, the drive pattern data corresponding to RHPAT01 through THPAT20 shown in FIG. 16 are sequentially output in response to the consecutive pulses. This is repeated in response to every twenty pulses, so that the first scanner is driven in the return direction.

Usually, the HP sensor 9 goes ON when the first scanner moves a certain distance in the return direction. However, when the HP sensor 9 remains in the OFF state due to some error (YES, step 118), the microcomputer 12 executes error processing (step 119).

When the HP sensor 9 goes ON, meaning that the first carriage C1 has entered the sensing range of the HP sensor adjoining the home position (YES, step 111), the microcomputer 12 determines whether or not the content of the counter PATCNT is odd (step 11A). If the answer of the step 11A is YES, the microcomputer 12 executes a step 11D. If the answer of the step 11A is NO, i.e., if the content of the counter PATCNT is even, the microcomputer 12 executes drive control using one pulse (step 11B), and increments the counter PATCNT to make it odd (step 11C). Next, the microcomputer stores the content of the counter PATCNT in a buffer PATCNTBF, and clears the counter PATCNT (step 11D). Then, the microcomputer 12 resets the home flag 2 and sets the home flag 3 (step 11E).

The steps 11A, 11B and 11C are executed in order to obviate a misstep when the drive mode is switched. Specifically, the displacement for a single pulse differs from the half-step drive mode to the full-step drive mode. Hence, if the drive patterns are discontinuous or not coincident, a misstep occurs and results in a difference between the control displacement and the actual displacement. In the illustrative embodiment, because the homing movement is controlled in the half-step drive mode while the usual scanning is controlled in the full-step drive mode, the drive mode is switched over on the transition from the homing movement to the usual scanning. At this instant, the steps 11A–11C are executed in order to eliminate a misstep.

For example, by comparing the half-step drive data patterns of FIG. 17 and the full-step drive data patterns of FIG. 19, it will be seen that the two kinds of data patterns (outputs of PROM1 and PROM2) coincide once for every two steps of the half-step drive data patterns. Therefore, when the drive switching step number is odd during the half-step drive control, data coincident with the current drive pattern is also present in the full-step drive table. This means that the drive pattern common to both of the drive modes is used. By the steps 11A–11C, the number of drive steps being counted by the counter PATCNT is made odd at the reference position where the HP sensor 9 goes ON. As a result, the drive is stopped by the drive pattern common to both the half-step drive and the full-step drive, so that a misstep, i.e., a positional deviation, is obviated when the drive mode is switched over.

However, in practical processing, the first carriage C1 is not immediately stopped at the above reference position, but it is further returned to the home position side by twenty pulses (twenty drive pattern switching periods) in order to guarantee stability. Specifically, after setting the home flag 3 (step 11E), the microcomputer 12 determines whether or not the counter PATCNT is "20" (step 11F). The microcomputer 12 outputs the drive pattern data until the counter PATCNT reaches "20" (step 11G). As a result, after the home flag 3 has been set, the motor 11 is further driven by 20 additional pulses. If the answer of the step (11F) is YES, the microcomputer 12 stops the timer step (11i) clears the home flag 3 (step 11J), and executes a subroutine for setting a drive pattern start address (step 11K). This is the end of the homing movement.

Figure 12:
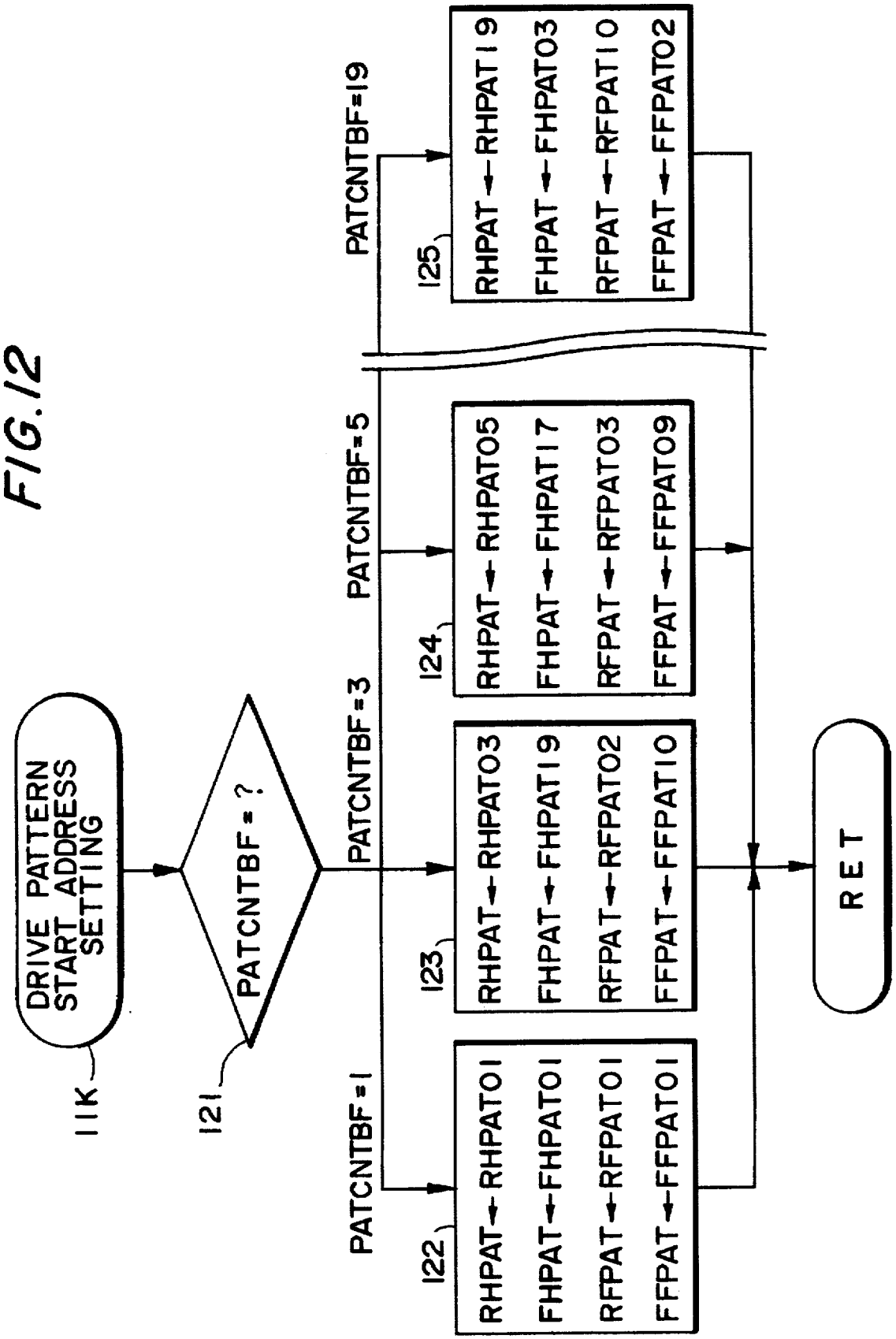
FIG. 12 is a flowchart showing a part of the processing of FIG. 11 in detail.

The step or subroutine 11K is shown in FIG. 12 in detail. It is to be noted that a part of the processing is not shown in FIG. 12. As shown, the microcomputer 12 selects a step to execute in accordance with the content of the buffer PATCNTBF, i.e., the content of the counter PATCNT occurring at the reference position where the HP sensor 9 turned from OFF to ON (step 121). Specifically, the microcomputer 12 executes a step 122 if the content of the buffer PATCNTBF is "1", executes a step 123 if it is "3", executes a step 124 if it is "5", . . . , and executes a step 125 if it is "19".

In any one of the steps 122, 123, 124, . . . , 125, the address of the table (see FIG. 16) assigned to the return direction of half-step drive is stored in a register RHPAT; the address of the table (see FIG. 17) assigned to the forward direction of half-step drive is stored in a register FHPAT; the address of the table (see FIG. 18) assigned to the return direction of full-step drive is stored in a register RFPAT; and the address of the table (see FIG. 19) assigned to the forward direction of full-step drive is stored in a register FFPAT. Why the addresses stored in the registers RHPAT, FHPAT, RFPAT and FFPAT are varied in accordance with the content of the buffer PATCNTBF is that the drive patterns should be prevented from being discontinuous on the transition from the homing movement (initial positioning) to the usual scanning movement. The tables each list all the respective drive patterns in substantially two iterative sets, as stated earlier. Hence, one whole set of drive patterns (one drive pattern circulation period) can be sequentially read out of each table regardless of the position of the drive pattern read out first and even when they are read in the ascending order of the addresses.

Figure 13:
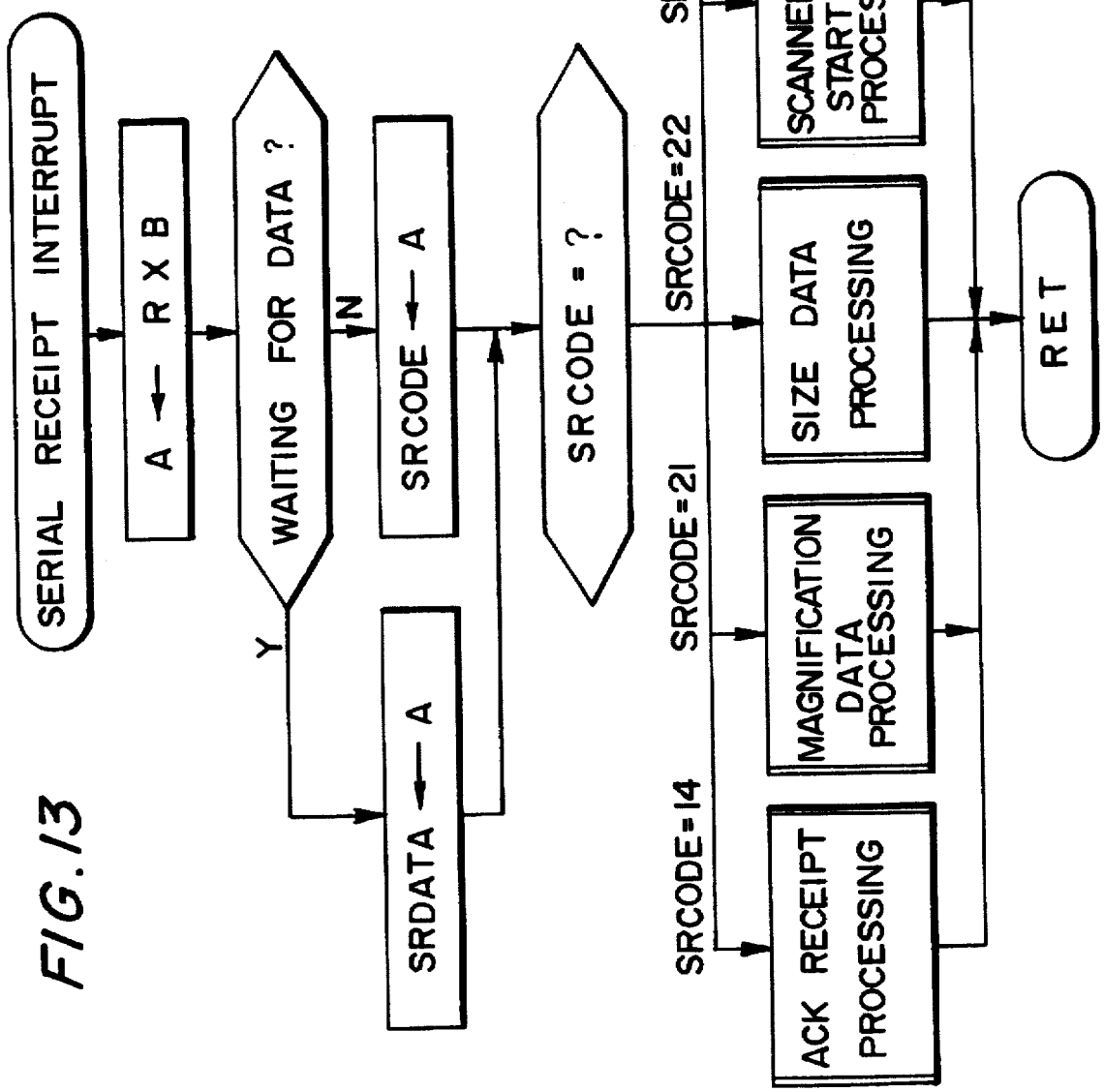
FIG. 13 is a flowchart demonstrating communication interrupt processing.

For the above homing movement, the macro function is not used; the drive pattern is switched over pulse by pulse by the software of the microcomputer 12. However, when the usual scanning for reading an image is performed, it is necessary to switch over the drive pattern at a relatively high speed. For this purpose, the macro function is used, as follows. When the main controller 101 sends a scanner start code to the microcomputer 12, a serial receipt interrupt occurs in the processing of the microcomputer 12. In response, the microcomputer 12 executes a procedure shown in FIG. 13. As shown, the microcomputer 12 reads the received data out of a receive buffer and identifies the code of the dam. If the received data SRCODE is the scanner start code, the microcomputer 12 executes a step or subroutine 131 labeled "SCANNER START PROCESSING".

Figure 14:
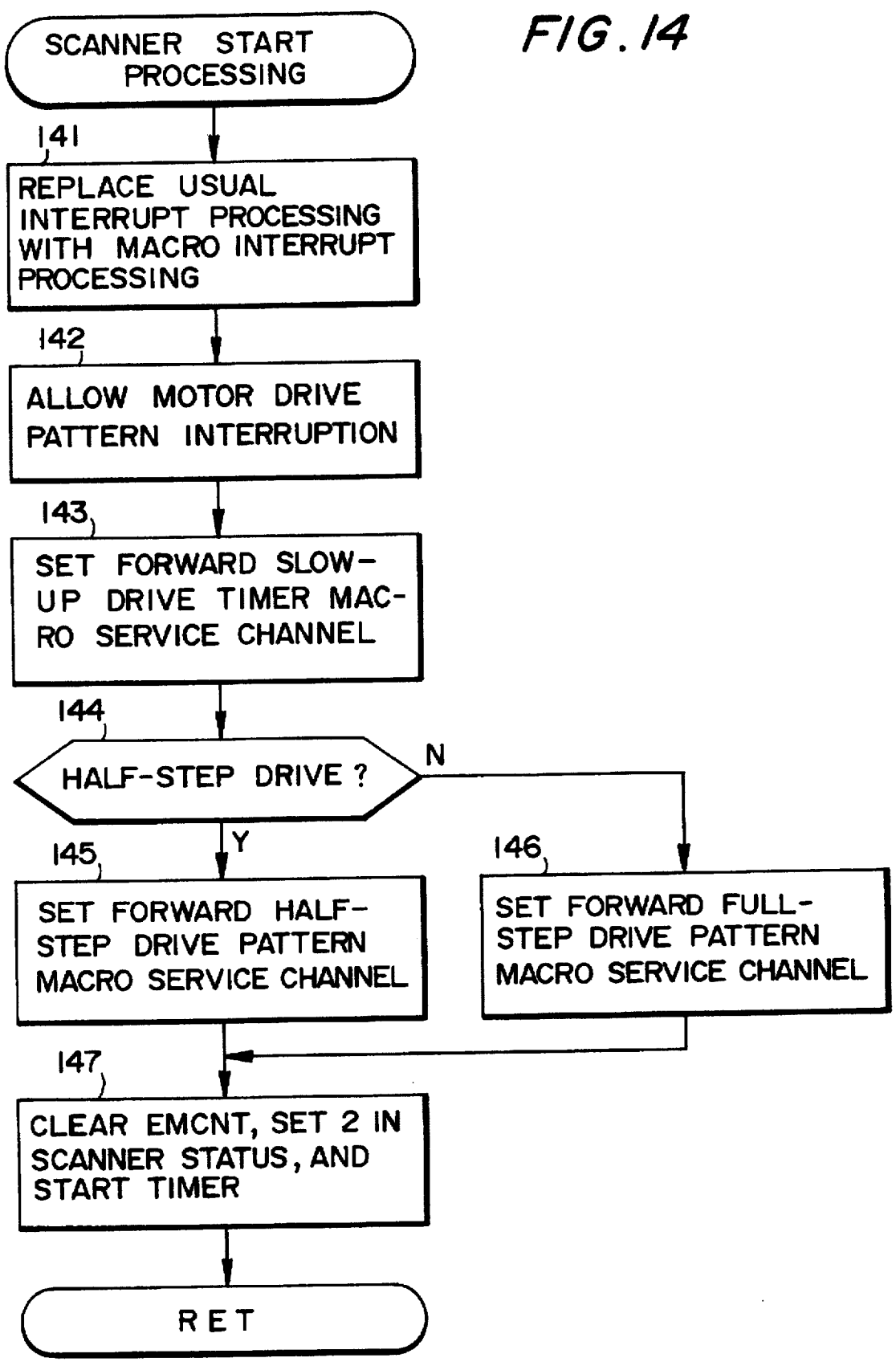
FIG. 14 is a flowchart showing a part of the processing of FIG. 13 in detail.

FIG. 14 shows the above subroutine 131 in detail. As shown, the microcomputer 12 switches the interrupt mode from the usual interrupt mode processing to the macro control interrupt processing (step 141). Then, the microcomputer 12 cancels the inhibition of the motor drive pattern interrupt, i.e., allows it to be done (step 142). Subsequently, the microcomputer 12 sets up a forward slow-up drive timer macro service channel (step 143). Specifically, the microcomputer 12 sets up the macro service channel 0 shown in FIG. 4. This allows the timing data in the slow-up area of the drive switching timing table (see FIG. 5) to be automatically transferred to the register MD1 of the timer one after another. The microcomputer 12 determines whether or not the drive is half-step drive (step 144). If the answer of the step 144 is YES, the microcomputer 123 executes a step 145; if otherwise, it executes a step 146. In the step 145, the microcomputer 12 sets the macro service channel 1, FIG. 4, and thereby allows the data in the forward half-step data area of the drive pattern table (see FIG. 5) to be automatically transferred to the real-time output port one after another. In the step 146, the microcomputer 12 sets up the macro service channel 1 and thereby allows the data in the forward full-step data area of the table to be automatically transferred to the real-time output one after another. On the channel 1, the leading address of the table is implemented by the value determined at the time of the homing movement. Thereafter, the microcomputer 12 clears the counter EMCNT, sets "2" in the scanner status, and then starts the timer (step 147).

On the completion of the above procedure, the drive pattern data read out of the table are automatically transferred to the real-time output port by the macro function. When one whole set of drive patterns is output (one drive pattern circulation period; twenty patterns for half-step drive or ten patterns for full-step drive), a motor drive pattern interrupt (INTTMF1) request is generated. In response, the microcomputer 12 executes a routine shown in FIG. 15.

Figure 15:
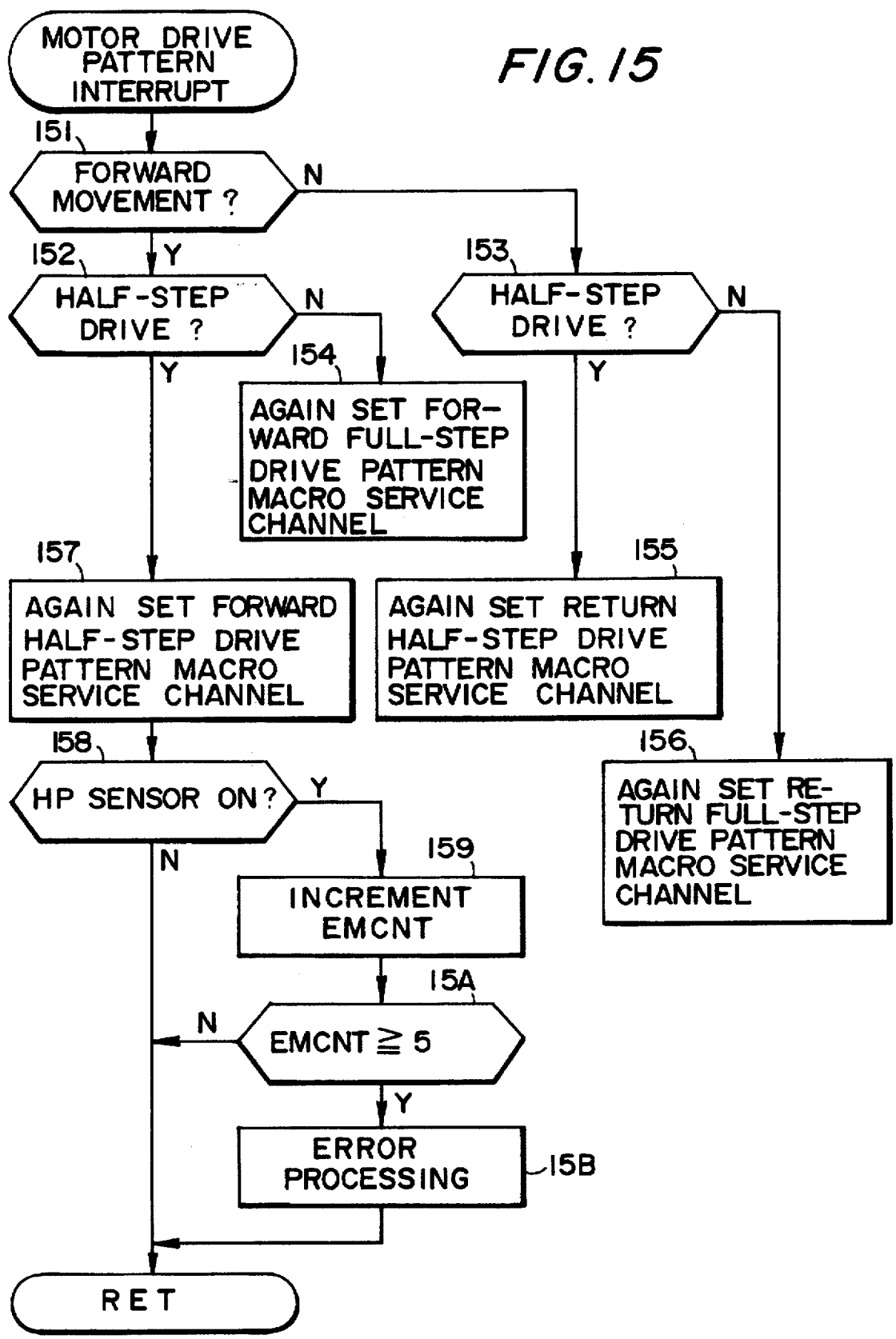
FIG. 15 is a flowchart representative of a motor drive pattern interrupt.

As shown in FIG. 15, the microcomputer 12 again sets the drive pattern macro service channel matching the drive sequence. Specifically, the microcomputer 12 executes a step 157 in the case of the forward half-step drive sequence, executes a step 154 in the case of the forward full-step drive sequence, executes a step 155 in the case of the return half-step drive sequence, or executes a step 156 in the case of the return full-step sequence. While a part of the processing is not shown in FIG. 15, it is identical with the other drive sequences. Subsequently, the microcomputer 12 checks the output of the HP sensor (step 158). If the HP sensor is in the ON state (Yes, step 158), the microcomputer 12 increments the counter EMCNT (step 159). Then, the microcomputer 12 determines whether or not the count of the counter EMCNT is unusual, i.e., greater than or equal to 5 (step 15A). If the answer of the step 15A is YES, the microcomputer 12 executes error processing (step 15B). The microcomputer 12 clears the counter EMCNT by the scanner start processing for every scanning.

Assume that the slow-up timer values of the drive switching timing table have been transferred to the register MD1 of the timer the preselected number of times by the drive timer macro service (macro service channel 0). Then, a motor drive timer interrupt request (INTTMF2) is generated. In response, the microcomputer 12 executes the motor drive timer interrupt processing shown in FIG. 9. If the scanner status is "2" due to the scanner start processing shown in FIG. 14, the microcomputer 12 executes, in the processing of FIG. 9, a step 92 for setting a forward constant speed, and then sets up the drive timer macro service channel. In this manner, the microcomputer 12 changes the scanner status and then completes a single scanning movement.

Figure 21:
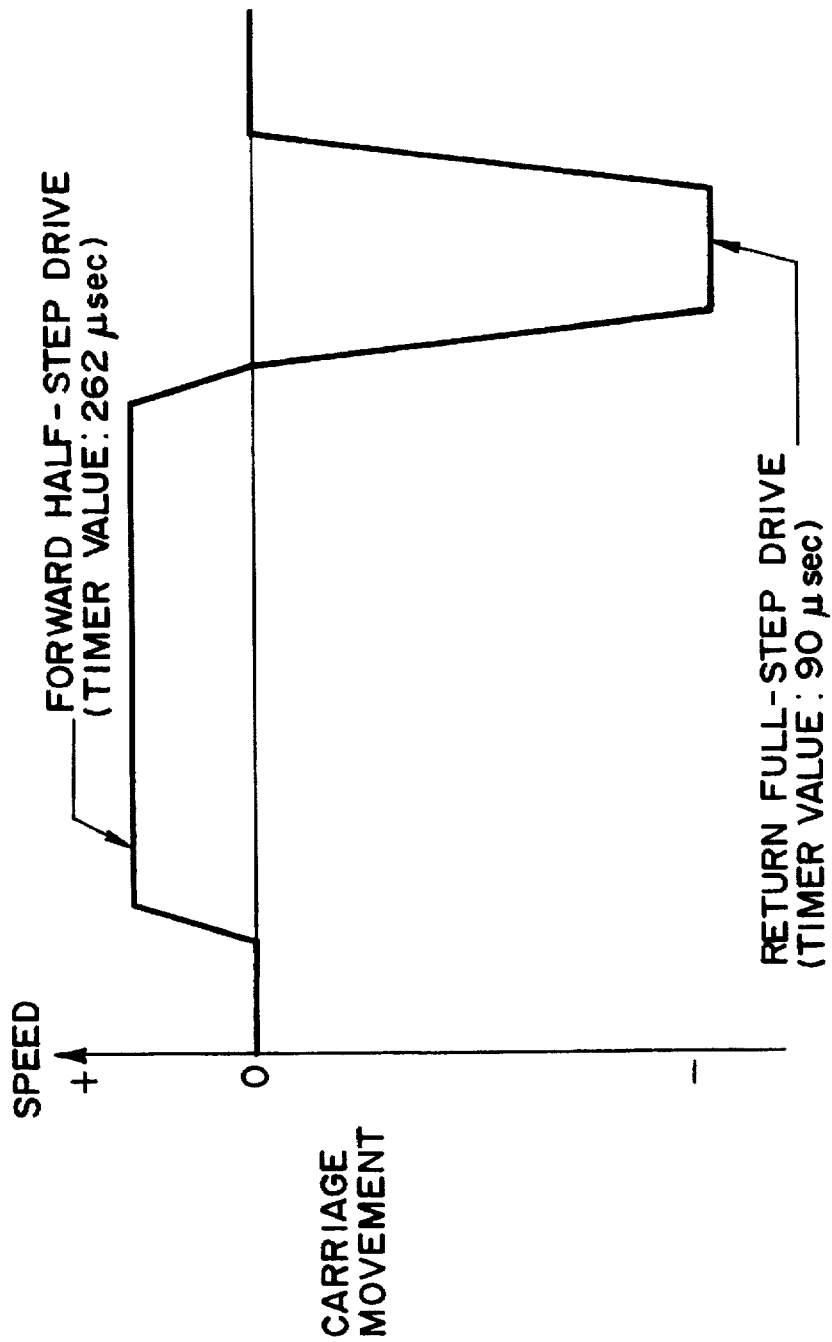
FIGS. 21 through 23 are timing charts each showing a particular image reading movement.
Figure 22:
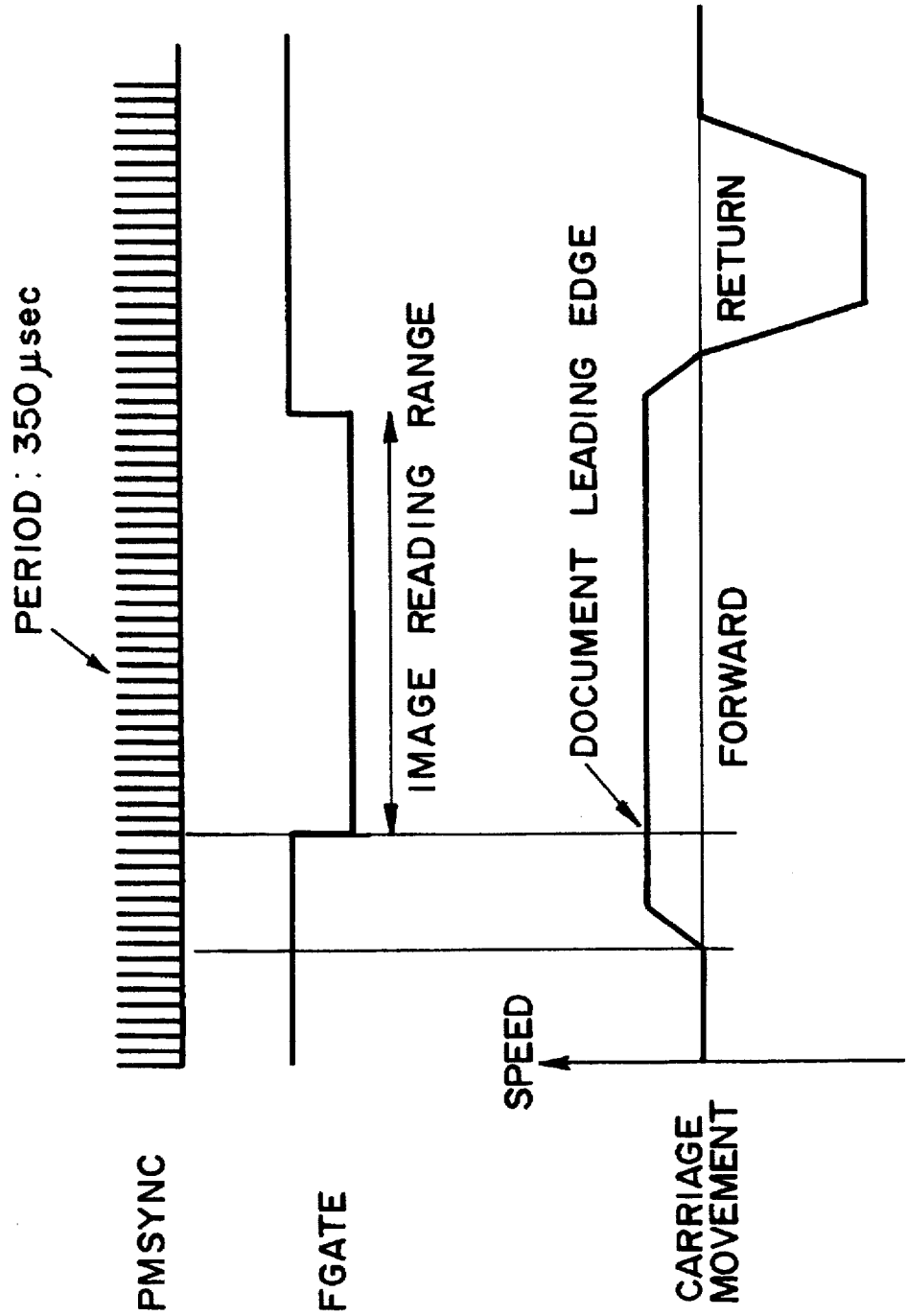
Figure 23:
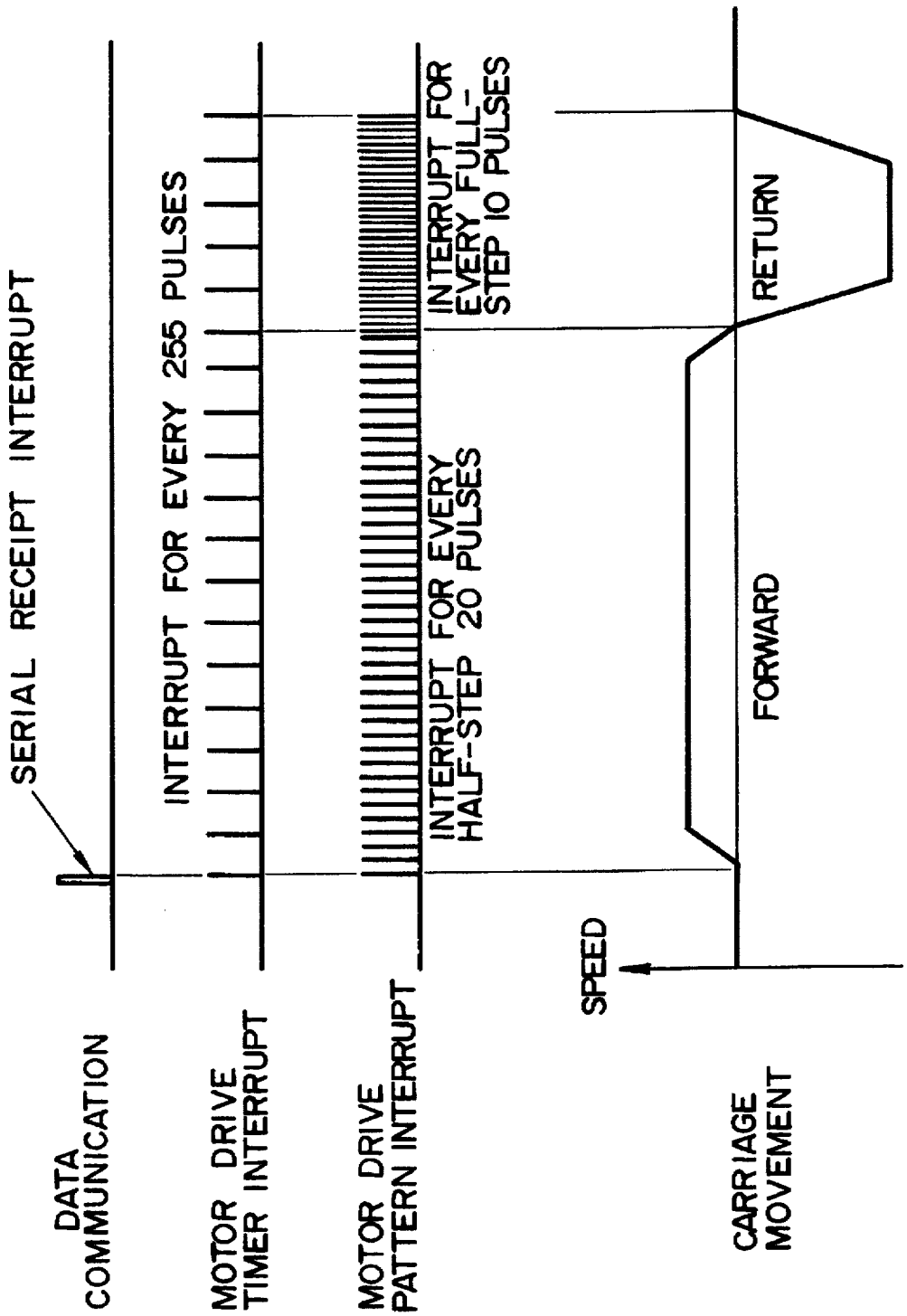

FIG. 20 is a timing chart representative of the homing operation while FIGS. 21, 22 and 23 are timing charts representative of the usual scanning operation. In FIG. 22, the signal PMSYNC is a synchronizing signal generated in the IPU 100, FIG. 2, once every time the printer scans one line. The image reading of the image scanner and the image recording of the printer can be synchronized to each other if the scanner drive start timing and the image read start timing are synchronized to the signal PMSYNC. The signal FGATE representative of the image reading range of the scanner is determined by the count of the signals PMSYNC. The leading end of the image reading area and the positive-going edge of the signal FGATE are coincident.

As shown in FIG. 23, during usual image reading, the motor drive timer interrupt occurs for every 255 pulses. In response, the processing shown in FIG. 9 is executed. The interrupt occurs for every twenty pattern switching pulses during forward scanning or for every ten pulses during return. In response, the processing shown in FIG. 15 is executed.

During homing movement, the above interrupt occurs in response to every pattern switching pulse, although not shown. In response, the processing shown in FIG. 9 is executed. The processing of FIG. 9 is executed for each of the two kinds of interrupt requests, i.e., a request responsive to every ten or twenty pulses due to the macro function, and a usual request responsive to every pulse. In the usual interrupt mode, the motor drive pattern interrupt is inhibited; the motor drive patterns are set by the processing of FIG. 9.

Before a scanning operation for reading a document, a prescanning operation is sometimes performed in order to read the highest or the lowest density of the document or the size of the document. Control over such prescanning is also controlled by the macro function, although not shown or described specifically.

In summary, the present invention provides an image reading device having various unprecedented advantages, as enumerated below.

(1) Control Step (92-96) for monitoring the output of position sensing means at one pulse period for switching the drive phase of a pulse motor, or control step (98) for monitoring it at a plurality of pulse periods is automatically selected in matching relation to the instantaneous drive condition. When a pulse motor is used to drive a movable scanning mechanism, only if the initial position is accurate, the varying position of the scanning mechanism can be accurately determined by counting the drive pulses. Specifically; only if the scanning mechanism is brought to its accurate home position at the time of power-up, it is possible to accurately determine a reference position for image reading on the basis of the above position and the number of drive pulses. Just after the power-up, a substantial period of time may be safely allocated to the positioning of the scanning mechanism, so that the mechanism can be driven at a low speed. In this case, it is not necessary to use a macro function because the drive phase switching period is long; that is, the output of the position sensing means can be monitored at every pulse period, implementing accurate initial positioning. When the scanning mechanism reads an image, it must be driven at a relatively high speed, so that the drive phase switching pulse period is short. In this condition, because the macro function is usable to switch over the drive phase at a short period, the scanning speed can be increased to realize rapid image reading. Even in this case, the reference position for image reading remains the same only if the initial positioning is accurate.

(2) When the drive speed of the pulse motor is low, the output of the position sensing means is monitored at every pulse period. Hence, accurate positioning is achievable. When the drive speed is high, the output of the position sensing means is monitored at a plurality of pulse periods. It follows that the macro function is usable to control the switchover of the drive phase, thereby enhancing rapid scanning for reading an image.

(3) When the scanning mechanism is to be located at its home position, the output of the position sensing means is monitored at every pulse period. This realizes accurate positioning.

(4) When the scanning mechanism is driven for reading an image, the output of the position sensing means is monitored at a plurality of pulse periods. Hence, the macro function is usable to control the switchover of the drive phase so as to reduce the image reading time.

(5) To bring the scanning mechanism to the home position, the pulse motor is driven in accordance with half-step drive patterns. This further enhances the accurate positioning of the scanning mechanism. When the position sensing mechanism senses the scanning mechanism being initially moved to its home position, the pulse motor is deenergized only after a pattern common to the half-step patterns and full-step patterns has occurred. Hence, when the half-step drive is replaced with the full-step drive, no deviation occurs in the drive patterns. That is, the number of drive switching steps and the actual number of drive steps are identical, obviating positional deviations.

(6) All the pattern data representative of the drive phases and stored in drive pattern holding means (13) are sequentially transferred to to a driver by DMA transferring means (MSP1, SFRP12 and MSC1). This allows the drive pattern to be rapidly switched over and thereby increases the driving speed. Further, the start address (drive pattern start position) of the data to be transferred by the DMA transferring means is determined on the basis of the count of position counting means (PATCNT) which is initialized in synchronism with the output of the position sensing means representative of the home position and is updated every time the drive phase is switched over. This obviates a difference between the actual position of the pulse motor and the drive pattern and thereby realizes accurate positioning.

(7) the drive pattern holding means stores substantially two periods of all the patterns representative of the drive phases of the pulse motor in its continuous addresses for every drive sequence. Hence, the memory capacity required of the holding means is reduced. Specifically, when the motor is continuously driven, one period of drive pattern data are sequentially and repeatedly output. However, if only one period of drive pattern data is available, the order of the drive patterns is determined beforehand when the drive is to start. As a result, if the drive starts at an arbitrary position, such a position and the position of the drive pattern differ from each other. On the other hand, if all of one period of data beginning with the individual drive pattern are prepared for every drive pattern, the driven can start at any of the drive patterns. This, however, is not practicable without resorting to a memory capacity equal to (number of drive patterns)×(one period of data). By contrast, in accordance with the present invention, substantially two periods of data of all the patterns are stored in the continuous addresses. Hence, even if the drive pattern is read at any address first, one period of data of all the drive patterns can be continuously read so long as the difference between the above address and the leading address is not greater than one period. That is, data starting at any drive pattern can be generated only if the memory capacity is great enough to accommodate only two periods of data.

Various modifications will become possible for those skilled in the art after receiving the teachings of the present disclosure without departing from the scope thereof.

What is claimed is:

1. An image reading device comprising:

a movable scanning mechanism including image reading means;

a pulse motor for driving said movable scanning mechanism;

position sensing means for sensing a position of said movable scanning mechanism;

drive control means for controlling drive of said pulse motor in response to an output signal of said position sensing means;

first monitoring means for monitoring the output signal of said position sensing means at one pulse period for switching a drive phase of said pulse motor;

second monitoring means for monitoring the output signal of said position sensing means at a plurality of pulse periods for switching the drive phase of said pulse motor; and selection control means for selecting either said first monitoring means or said second monitoring means in accordance with an instantaneous drive condition, and controlling the drive of said pulse motor by using the selected monitoring means.

2. A device as claimed in claim 1, wherein said selection control means selects said first monitoring means when a drive speed of said pulse motor is low, or selects said second monitoring means when the drive speed is high.

3. A device as claimed in claim 1, wherein said selection control means selects said first monitoring means when said movable scanning mechanism is to be initially located at a predetermined home position.

4. A device as claimed in claim 1, wherein said selection control means selects said second monitoring means when said movable scanning mechanism is driven for reading an image.

5. A device as claimed in claim 1, further comprising:

half-step driving means for driving said pulse motor with half-step drive patterns when said movable scanning mechanism is to be initially located at a predetermined home position; and positioning control means for stopping, when said position sensing means senses said movable scanning mechanism initially brought to the predetermined home position, the drive of said pulse motor after the half-step drive pattern coincides with any one of full-step drive patterns.

6. A device as claimed in claim 1, further comprising:

drive pattern holding means for holding data representative of all patterns representative of drive phase of said pulse motor;

DMA (Direct Memory Access) transferring means for sequentially transferring, by DMA transfer, data representative of a plurality of patterns stored in said drive pattern holding means to a driver for driving said pulse motor;

position counting means initialized in synchronism with sensing of a predetermined home position by said position sensing means, and updated every time the drive phase of said pulse motor is switched; and address determining means for determining, based on a count of said position counting means, a start address of the data to be transferred by said DMA transferring means.

7. A device as claimed in claim 6, wherein said drive pattern holding means stores substantially two period of data of all patterns representative of drive phases for driving said pulse motor in continuous addresses thereof for every drive sequence.

8. An image reading device comprising:

a movable scanning mechanism including a scanner;

a pulse motor driving said movable scanning mechanism;

a position sensor sensing a position of said movable scanning mechanism;

a drive controller controlling drive of said pulse motor in response to an output signal of said position sensor;

a first monitoring device monitoring the output signal of said position sensor at one pulse period for switching a drive phase of said pulse motor;

a second monitoring device monitoring the output signal of said position sensor at a plurality of pulse periods for switching the drive phase of said pulse motor; and a selection controller selecting either said first monitoring device or said second monitoring device in accordance with an instantaneous drive condition, and controlling the drive of said pulse motor by using the selected monitoring device.

9. A device as claimed in claim 8, wherein said selection controller selects said first monitoring device when a drive speed of said pulse motor is low, or selects said second monitoring device when the drive speed is high.

10. A device as claimed in claim 8, wherein said selection controller selects said first monitoring device when said movable scanning mechanism is to be initially located at a predetermined home position.

11. A device as claimed in claim 8, wherein said selection controller selects said second monitoring device when said movable scanning mechanism is driven for reading an image.

12. A device as claimed in claim 8, further comprising:

a half-step driver driving said pulse motor with half-step drive patterns when said movable scanning mechanism is to be initially located at a predetermined home position; and a positioning controller stopping, when said position sensor senses said movable scanning mechanism initially brought to the predetermined home position, the drive of said pulse motor after the half-step drive pattern coincides with any one of full-step drive patterns.

13. A device as claimed in claim 8, further comprising:

a drive pattern holder holding data representative of all patterns representative of drive phase of said pulse motor;

a DMA (Direct Memory Access) transfer device for sequentially transferring, by DMA transfer, data representative of a plurality of patterns stored in said drive pattern holder to a driver for driving said pulse motor;

a position counter initialized in synchronism with sensing of a predetermined home position by said position sensor, and updated every time the drive phase of said pulse monitor is switched; and an address determining device determining, based on a count of said position counter, a start address of the data to be transferred by said DMA device.

14. A device as claimed in claim 13, wherein said drive pattern holder stores substantially two period of data of all patterns representative of drive phases for driving said pulse motor in continuous addresses thereof for every drive sequence.

* * * * *